US012674964B2

(12) United States Patent
Sin

(10) Patent No.: US 12,674,964 B2
(45) Date of Patent: Jul. 7, 2026

(54) OPTICAL SYSTEM

(71) Applicant: LG INNOTEK CO., LTD., Seoul (KR)

(72) Inventor: Doo Shik Sin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 379 days.

(21) Appl. No.: 18/256,558

(22) PCT Filed: Dec. 9, 2021

(86) PCT No.: PCT/KR2021/018688
§ 371 (c)(1),
(2) Date: Jun. 8, 2023

(87) PCT Pub. No.: WO2022/124836
PCT Pub. Date: Jun. 16, 2022

(65) Prior Publication Data
US 2024/0094509 A1     Mar. 21, 2024

(30) Foreign Application Priority Data
Dec. 9, 2020     (KR) ........................ 10-2020-0171667

(51) Int. Cl.
G02B 13/00     (2006.01)
G02B 9/64     (2006.01)
(52) U.S. Cl.
CPC ........... G02B 13/0045 (2013.01); G02B 9/64 (2013.01)
(58) Field of Classification Search
CPC .............................. G02B 13/0045; G02B 9/64
See application file for complete search history.

(56) References Cited

U.S. PATENT DOCUMENTS 5,754,345  A     5/1998  Yamamota
11,914,223 B2    2/2024  Sun
(Continued)

FOREIGN PATENT DOCUMENTS

CN     111736309 A     10/2020
CN     111736310 A     10/2020
(Continued)

OTHER PUBLICATIONS

Gross et al., Handbook of Optical Systems, vol. 3: Aberration Theory and Correction of Optical Systems, pp. 377-378, 2007 (Year: 2007).*
International Search Report dated Apr. 4, 2022 in International Application No. PCT/KR2021/018688.
(Continued)

*Primary Examiner* — Jessica M Merlin
(74) *Attorney, Agent, or Firm* — SALIWANCHIK, LLOYD & EISENSCHENK

(57)     ABSTRACT

An optical system disclosed in the embodiment of the invention includes a first lens to an eighth lenses which are sequentially arranged along an optical axis in a direction from the object side to the sensor side, wherein the first lens has a positive refractive power and has a convex object-side surface, the second lens has a negative refractive power and a concave sensor-side surface, at least one of an object-side and sensor-side surfaces of the sixth lens has an inflection point, the seventh lens has positive refractive power and has a convex sensor-side surface, the eighth lens has negative refractive power, and the object-side surface and the sensor-side surface of the eighth lens have at least one an inflection point, and a center thickness of the seventh lens may be the thickest among center thicknesses of the first to eighth lenses.

20 Claims, 7 Drawing Sheets

Object side          Image side

(56)            References Cited

U.S. PATENT DOCUMENTS

| | | |
|---|---|---|
| 12,411,315 B2 | 9/2025 | Sun |
| 2018/0180856 A1 | 6/2018 | Jung et al. |
| 2018/0239117 A1 | 8/2018 | Lee et al. |
| 2020/0012078 A1 | 1/2020 | Kuo |
| 2020/0301106 A1 | 9/2020 | Jung et al. |
| 2021/0055519 A1* | 2/2021 | Wei ...................... G02B 13/006 |
| 2022/0026671 A1* | 1/2022 | Sun ........................ G02B 13/04 |
| 2022/0026673 A1 | 1/2022 | Sun et al. |
| 2022/0206256 A1 | 6/2022 | Chen |
| 2024/0094509 A1 | 3/2024 | Sin |

FOREIGN PATENT DOCUMENTS

| | | | |
|---|---|---|---|
| CN | 111736311 A | 10/2020 | |
| CN | 111736310 B | 11/2020 | |
| EP | 4 261 584 A1 | 10/2023 | |
| JP | 2-201409 A | 8/1990 | |
| JP | 9-90214 A | 4/1997 | |
| JP | 2006-195064 A | 7/2006 | |
| KR | 10-2017-0109859 A | 10/2017 | |
| KR | 10-2018-0076742 A | 7/2018 | |
| KR | 10-2018-0095276 A | 8/2018 | |
| KR | 10-2020-0083121 A | 7/2020 | |

OTHER PUBLICATIONS

Office Action dated Dec. 16, 2025 in Japanese Application No. 2023-535587.
Office Action dated Apr. 22, 2026 in European Application No. 21903881.7.

* cited by examiner

OPTICAL SYSTEM

CROSS-REFERENCE TO RELATED APPLICATIONS

This application is the U.S. national stage application of International Patent Application No. PCT/KR2021/018688, filed Dec. 9, 2021, which claims the benefit under 35 U.S.C. § 119 of Korean Application No. 10-2020-0171667, filed Dec. 9, 2020, the disclosures of each of which are incorporated herein by reference in their entirety.

TECHNICAL FIELD

The embodiment relates to an optical system for high resolution.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or prevent image stabilization due to an unstable fixing device or a camera movement caused by a user's movement. The most important element for this camera module to obtain an image is an imaging lens that forms an image. Recently, interest in high performance such as high image quality and high resolution is increasing, and research on an optical system including 5 or 6 lenses is being conducted in order to realize this. For example, research using a plurality of imaging lenses having positive (+) and/or negative (−) refractive power to implement a high-performance optical system is being conducted. However, when arranging a plurality of lenses, there is a problem in that it is difficult to derive excellent optical properties and aberration properties. Therefore, a new optical system capable of solving the above-described problem is required.

DISCLOSURE

Technical Problem

An embodiment of the invention provides an optical system with improved optical properties. An embodiment of the invention provides a wide-angle optical system having at least eight lenses. An embodiment of the invention provides an optical system in which the object-side surface and the sensor-side surface of at least eight lenses have aspherical surfaces. An embodiment of the invention provides an optical system in which at least one lens having positive (+) refractive power and at least four lenses having negative (−) refractive power are aligned with respect to an optical axis among at least eight lenses.

Technical Solution

An optical system according to an embodiment of the invention comprises a first lens, a second lens, a third lens, a fourth lens, a fifth lens, a sixth lens, a seventh lens, and an eight lens which are sequentially arranged along an optical axis from an object side to a sensor side direction, wherein the first lens has negative refractive power and has a concave object-side surface on the optical axis, the fourth lens has both object-side and sensor-side surfaces which are convex on the optical axis, and has a low refractive index, wherein the fifth lens has a concave sensor-side surface on the optical axis and has a high refractive index, wherein the seventh lens has positive refractive power and has a convex sensor-side surface on the optical axis, wherein the eighth lens has a negative (−) refractive power and has a concave sensor-side surface on the optical axis, and wherein the optical system satisfies Equation 1: [Equation 1] $0.5<f4/F<1.5$, where f4 is a focal length of the fourth lens, and F is an effective focal length of the optical system.

According to an embodiment of the invention, at least one of Equations 2, 3 and 4 is satisfied: [Equation 2] $1.4<nd1<1.6$, where nd1 is a refractive index of the first lens at 587 nm, and [Equation 3] $10<vd5<30$, where vd5 is an Abbe's number of the fifth lens, [Equation 4] $F/EPD>1$, where EPD may be an incident pupil diameter of an optical system.

According to an embodiment of the invention, at least one of Equations 5, 6 and 7 is satisfied: [Equation 5] $1<T1/T3<5$, [Equation 6] $1<T4/T5<5$, and [Equation 7] $1<T7/T8<5$, where T1 is a center thickness of the first lens, T3 is a center thickness of the third lens, T4 is a center thickness of the fourth lens, T5 is a center thickness of the fifth lens, T7 is a center thickness of the seventh lens, and T8 may be a center thickness of the eight lens.

According to an embodiment of the invention, at least one of Equations 8 and 9 is satisfied: [Equation 8] $|f5|>|f4|$, [Equation 9] $0.5<|f7|/|f8|<2$, where f4 may be a focal length of the fourth lens, f5 may be a focal length of the fifth lens, f7 may be a focal length of the seventh lens, and f8 may be a focal length of the eighth lens.

According to an embodiment of the invention, the center thickness of the first lens is thicker than each of the center thicknesses of the second to eighth lenses, and an optical axis interval between the first and second lenses may be greater than an optical axis interval between two adjacent lenes of the second to eighth lenses.

According to an embodiment of the invention, the number of lenses having a convex object-side surface on the optical axis of the first to eighth lenses may be four or more, and the number of lenses having a concave object-side surface may be four or less.

According to an embodiment of the invention, a number of lenses having a convex sensor-side surface on the optical axis of the first to eighth lenses may be four or more, and a number of lenses having a concave sensor-side surface may be four or less. The sensor-side surfaces of the first, fifth, sixth, and eighth lenses may be concave. Among the first to eighth lenses, a number of lenses having an Abbe's number of 50 or more may be five or more, and a number of lenses having an Abbe number of 50 or more may be three or less.

According to an embodiment of the invention, among the first to eighth lenses, a number of lenses having a refractive index of 1.6 or more may be three or more, and a number of lenses having a refractive index of less than 1.6 may be five or less. A number of lenses having a center thickness of 0.5 mm or more of the first to eighth lenses is three or more, and a number of lenses having a thickness of less than 0.5 mm is five or less, and when a center thickness of the first, second, and third lenses is T1, T2, and T3, a following relation may be satisfied: T3<T2<T1. When the center thickness of the third to sixth lenses is T3, T4, T5, and T6, a following relation may be satisfied: T5≤T3<T6<T4.

According to an embodiment of the invention, a focal length of the second lens among the first to eighth lenses may be the largest. With respect to the third lens, an effective diameter of the object-side or sensor-side surface becomes smaller in the order of the first lens, the second lens, and the third lens, and with respect to the third lens, an effective diameter of the object-side or the sensor-side surface may increase in the order of the third lens, the fourth lens, the fifth lens, and the sixth lens.

The optical system according to an embodiment of the invention includes a first lens, a second lens, a third lens, a fourth lens, a fifth lens, a sixth lens, a seventh lens, and a eighth lens, which are sequentially arranged along an optical axis in a direction from an object side to a sensor side, wherein the first lens has negative refractive power and has a concave object-side surface on the optical axis, and the fourth lens has both object-side and sensor-side surfaces which are convex on the optical axis, and has a low refractive index, wherein the fifth lens has a concave sensor-side surface on the optical axis and has a high refractive index, wherein the seventh lens has positive refractive power and has a convex sensor-side surface on the optical axis, and the eighth lens has a negative (−) refractive power and has a convex sensor-side surface on the optical axis, wherein a number of the lenses with the convex object-side surface on the optical axis in the first to eighth lenses are four or more, a number of the lenses with the concave sensor-side surface are five or less, and a surface having an inflection point among the object-side surfaces and the sensor-side surfaces of the first to eighth lenses may be four or more.

According to an embodiment of the invention, an image sensor disposed on the sensor side of the eighth lens; and an optical filter disposed between the image sensor and the eighth lens includes, and at least one of Equations 1 to 4 above may include.

Advantageous Effects

The optical system according to an embodiment of the invention may correct aberration characteristics and realize a slim optical system. Accordingly, the optical system may be miniaturized and high quality and high resolution may be realized. The optical system according to an embodiment of the invention may block unnecessary light entering the optical system. Accordingly, it is possible to improve the performance of the optical system by reducing aberration.

DESCRIPTION OF DRAWINGS

FIG. 3 is a block diagram of an optical system according to a second embodiment of the invention.

FIG. 5 is a block diagram of an optical system according to a third embodiment of the invention.

FIG. 7 is a perspective view of a mobile terminal having an optical system according to an embodiment of the invention.

BEST MODE

Figure 1:
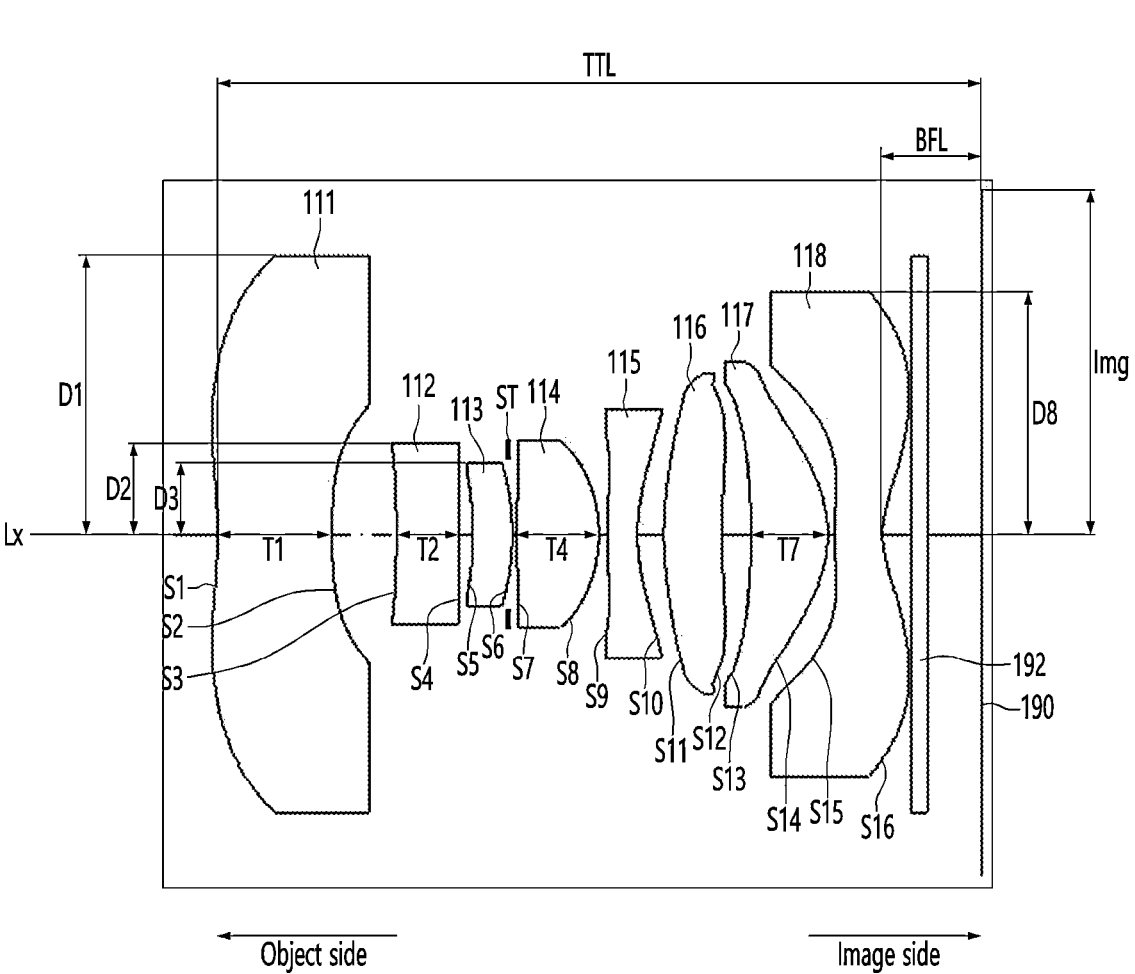
FIG. 1 is a block diagram of an optical system according to a first embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In the description of the invention, the first lens means the lens closest to the object side among the plurality of lenses aligned with the optical axis, and the last lens means the lens closest to the image side (or sensor side) among the plurality of lenses aligned with the optical axis. In the description of the invention, all measures for the radius, effective diameter, thickness, distance, BFL (Back Focal Length), TTL (Total Track Length or Total Top Length), etc. of the lens are mm unless otherwise specified. In the present specification, the shape of the lens is shown based on the optical axis of the lens. For example, that the object-side or image-side surface of the lens is convex means that the optical axis vicinity is convex on the object-side or image-side surface of the lens, but does not mean that the optical axis periphery is convex. Accordingly, even when it is described that the object side of the lens is convex, the portion around the optical axis on the object side of the lens may be concave. In the present specification, it should be noted that the thickness and radius of curvature of the lens are measured based on the optical axis of the lens. In addition, "object-side surface" may refer to the surface of the lens facing the object side with respect to the optical axis, and "image side" refers to the surface of the lens facing the imaging surface with respect to the optical axis.

An optical system according to an embodiment of the invention may include a plurality of lenses. In detail, the optical system according to the first to third embodiments may include at least eight lenses. As the resolution progresses, the size of the image sensor also increases, and the number of lenses gradually increases according to the resolution of the image sensor. An embodiment of the invention is to provide a high-resolution optical system using at least eight lenses.

Referring to FIG. 1, the optical system according to the first embodiment may be include, for example, a first lens 111, a second lens 112, and a third lens 113 a fourth lens 114, a fifth lens 115, a sixth lens 116, a seventh lens 117, and an eighth lens 118 which are sequentially arranged from the object side to the image side. The optical system may include an optical filter 192 and an image sensor 190. The optical system having the plurality of lenses 111-118 may be defined as a lens optical system, and the optical system further including the lenses 111-118, the optical filter 192 and the image sensor 192 may be defined as a camera module. The camera module may include at least one of a circuit board, at least one lens holder supporting at least one lens or two or more lenses, and one or a plurality of driving members for moving the lens holder in an optical axis direction and/or a direction perpendicular to the optical axis.

The first to eighth lenses 111, 112, 113, 114, 115, 116, 117, and 118 may be sequentially disposed along the optical axis Lx of the optical system. The light corresponding to the image information of the object is the first lens 111, the second lens 112, the third lens 113, the fourth lens 114, the fifth lens 115, and the sixth lens 116, the seventh lens 117, and the eighth lens 118, pass through the optical filter 192 to focus on the image sensor 190, and may be obtained as an electrical signal.

Each of the first to eighth lenses 111, 112, 113, 114, 115, 116, 117 and 118 may include an effective region and an ineffective region. The effective region may be a region in which light effective to each lens is incident or emitted. That is, the effective region may be a region in which incident light is refracted to realize optical properties. The ineffective region may be disposed around the effective region. The ineffective region may be a region to which the light is not incident. That is, the ineffective region may be a region independent of optical characteristics of the optical system. In addition, the ineffective region may be a region fixed to a barrel (not shown) for accommodating the lens, or a region in which light is blocked by a light blocking unit or a spacer. Here, the object-side surface may be an incident surface, and the sensor-side surface may be an image-side surface or an exit-side surface.

At least one or two or more of the first to eighth lenses 111, 112, 113, 114, 115, 116, 117, 118, or at least one or two or more of the fifth to eighth lenses 115, 116, 117, 118 may have an effective diameter in a first direction orthogonal to the optical axis Lx that is smaller than an effective diameter in a second direction orthogonal to the first direction. Such lens(s) may be provided in a non-circular shape having a diameter in the second direction and a distance smaller than the diameter in the first direction.

The optical system according to FIG. 1 may include an aperture stop ST for adjusting the amount of incident light. The aperture stop ST may be disposed between two lenses selected from among the first to eighth lenses 111, 112, 113, 114, 115, 116, 117 and 118. For example, the aperture stop ST may be disposed on the outer periphery between the third lens 113 and the fourth lens 114, or on the outer periphery between the second lens 112 and the third lens 113. The aperture stop ST may be disposed around the sensor-side surface of the third lens 113 or the object-side surface of the fourth lens 114. As another example, at least one of the first to eighth lenses 111, 112, 113, 114, 115, 116, 117 and 118 may serve as an aperture stop. For example, one selected from among the lens surfaces of the first to eighth lenses 111, 112, 113, 114, 115, 116, 117 and 118 may serve as an aperture stop for controlling the amount of light. For example, the periphery of the sensor-side surface of the third lens 113 or the perimeter of the object side of the fourth lens 114 may serve as an aperture stop.

Referring to FIG. 1, in the optical system, the first lens 111 may have negative (−) refractive power. The first lens 111 may include a plastic material. The first lens 111 may include a first surface S1 defined as an object-side surface and a second surface S2 defined as a sensor-side surface. On the optical axis Lx, the first surface S1 may be concave and the second surface S2 may be concave. At least one or both of the first surface S1 and the second surface S2 of the first lens 111 may be aspherical. At least one of the first surface S1 and the second surface S2 may have an inflection point, for example, the first surface S1 may have an inflection point between the periphery of the optical axis and an edge of the first surface S1. The size of the effective diameter of the object-side surface or the sensor-side surface of the first lens 111 may be greater than the size of the effective diameter of the object-side surface or the sensor-side surface of the second lens 112 or the third lens 113. Here, the effective diameter may be the diameter of the effective region of the object-side surface or the sensor-side surface on which light is incident.

The second lens 112 may have positive (+) refractive power. The second lens 112 may include a plastic or glass material. The second lens 112 may include a third surface S3 defined as an object-side surface and a fourth surface S4 defined as a sensor-side surface. On the optical axis Lx, the third surface S3 may be concave and the fourth surface S4 may be convex. At least one or both of the third surface S3 and the fourth surface S4 may be aspherical. As another example, the second lens 112 may have a negative refractive power, the third surface S3 may be convex or planar, and the fourth surface S4 may be concave or planar.

Here, a center thickness of the first lens 111 may be greater than a center thickness of each of the second and third lenses 112 and 113. The center thickness of the first lens 111 may be 1.5 times or more, for example, in a range of 1.5 to 2.5 times the center thickness of the second lens 112. The thickness of the center of the first lens 111 may be at least twice the thickness of the center of the third lens 113, for example, in the range of 2 times to 4 times, or in the range of 2.5 times to 3.5 times. Here, the center thickness of the first lens 111 may be the largest among the center thicknesses of the lenses of the optical system, and may be 0.7 mm or more, for example, in the range of 0.7 mm to 1 mm. The center thickness of the first lens 111 may be greater than the sum of the center thicknesses of the second lens 112 and the third lens 113.

The optical axis interval between the first lens 111 and the second lens 112 may be the largest among the intervals between the two adjacent lenses, and may be, for example, 80% or more the center thickness of the second lens 112, for example, in a range of 80% to 120%. A difference between an optical axis interval between the first lens 111 and the second lens 112 and a center thickness of the second lens 112 may be 0.1 mm or less. The optical axis interval between the first lens 111 and the second lens 112 may be 0.35 mm or more, for example, in the range of 0.35 mm to 0.55 mm.

The third lens 113 may have positive (+) refractive power. The third lens 113 may include a plastic or glass material. The third lens 113 may include a fifth surface S5 defined as an object-side surface and a sixth surface S6 defined as a sensor-side surface. The fifth surface S5 may be concave and the sixth surface S8 may be convex. That is, the third lens 113 may have a meniscus shape convex toward the image side. At least one or both of the fifth surface S5 and the sixth surface S6 may be aspherical. As another example, the third lens 113 may have a negative refractive power, the fifth surface S5 may be convex or planar, and the sixth surface S6 may be concave or planar.

The optical axis interval between the second lens 112 and the third lens 113 may be smaller than the optical axis interval between the first and second lenses 111 and 112 and greater than the optical axis interval between the third and fourth lenses 113 and 114. The optical axis interval between the second lens 112 and the third lens 113 is smaller than the optical axis interval between the fifth and sixth lenses 115 and 116, and is smaller than the optical axis interval between the sixth and seventh lenses 116 and 117, and may be greater than the optical axis interval between the seventh and eighth lenses 117 and 118.

The fourth lens 114 may have positive (+) refractive power. The fourth lens 114 may include a plastic or glass material. The fourth lens 114 may include a seventh surface S7 defined as an object-side surface and an eighth surface S8 defined as a sensor-side surface. On the optical axis, the seventh surface S7 may be convex, and the eighth surface S8 may be convex. At least one or both of the seventh surface S7 and the eighth surface S8 may be aspherical. Both surfaces of the fourth lens 114 may be convex, and when expressed as an absolute value, the radius of curvature of the seventh surface S7 at the center may be greater than the radius of curvature of the eighth surface S8, and may be 5.5 mm or more, for example, in the range of 5.5 mm to 8 mm. The radius of curvature of the seventh surface S7 at the center may be smaller than the radius of curvature of the third surface S3, and the difference between the radius of curvature of the seventh surface S7 and the radius of curvature of the second surface S7 may be 2 mm or less. Here, the center thickness of the fourth lens 114 may be greater than the center thickness of the second lens 112, and may be 0.45 mm or more, for example, in the range of 0.45 mm to 0.7 mm. The difference between the center thickness of the fourth lens 114 and the center thickness of the seventh lens 117 may be 0.1 mm or less, for example, in the range of 0.005 mm to 0.1 mm. A center thickness of the fourth lens 114 may be greater than a sum of the center thicknesses of the third lens 113 and the fifth lens 115.

The fifth lens 115 may have negative (−) refractive power. The fifth lens 115 may include a plastic or glass material. The fifth lens 115 may include a ninth surface S9 defined as an object-side surface and a tenth surface S10 defined as a sensor-side surface. The ninth surface S9 may be convex and the tenth surface S10 may be concave. The ninth surface S9 may have at least one inflection point around the center. At least one or both of the ninth surface S9 and the tenth surface S10 may be aspherical. As another example, the ninth surface S9 of the fifth lens 115 may be flat or concave.

Here, based on the third lens 113, the effective diameter of the object-side or sensor-side surface may become smaller in the order of the first lens 111, the second lens 112, and the third lens 113. With respect to the third lens 113, the effective diameter of the object-side or sensor-side surface may increase in the order of the third lens 113, the fourth lens 114, the fifth lens 115 and the sixth lens 116. In addition, the effective diameter of the object-side or sensor-side surface of the seventh lens 117 may be greater than the effective diameter of each surface of the sixth lens 116 and smaller than the effective diameter of each surface of the eighth lens 118.

The sixth lens 116 may have positive (+) refractive power. The sixth lens 116 may include a plastic or glass material. The sixth lens 116 may include an eleventh surface S11 defined as an object-side surface and a twelfth surface S12 defined as a sensor-side surface. On the optical axis, the eleventh surface S11 may be convex and the twelfth surface S12 may be concave. The eleventh surface S11 and the twelfth surface S12 may be aspherical. The twelfth surface S12 may have at least one inflection point around the center. The inflection point may be disposed closer to the edge than to the optical axis or the center. As another example, the sixth lens 116 may have negative refractive power, the eleventh surface S11 may be flat or concave, and the twelfth surface S12 may be flat or convex.

A center thickness of the sixth lens 116 may be thicker than a center thickness of the fifth lens 115, and may be thinner than a center thickness of the seventh lens 117. When the absolute value is expressed, the radius of curvature of the eleventh surface S11 at the center is greater than the radius of curvature of the tenth surface S10 of the fifth lens 115, and may be greater than the radius of curvature of the fourteenth surface S14 of the seventh lens 117. When the absolute value is expressed, the radius of curvature of the twelfth surface S12 at the center may be greater than the respective radii of curvature of the tenth surface S10 and the eleventh surface S11, and may be smaller than the radius of curvature of the thirteenth surface S13 of the seventh lens 117.

The seventh lens 117 may have negative (−) refractive power. The seventh lens 117 may include a plastic or glass material. The seventh lens 117 may include a thirteenth surface S13 defined as an object-side surface and a fourteenth surface S14 defined as a sensor-side surface. On the optical axis Lx, the thirteenth surface S13 may be concave and the fourteenth surface S14 may be convex. That is, the seventh lens 117 may have a meniscus shape convex toward the sensor side. At least one or both of the thirteenth surface S13 and the fourteenth surface S14 may be aspherical. As another example, the thirteenth surface S13 may be flat or convex.

A center thickness of the seventh lens 117 may be greater than a center thickness of the sixth lens 116 and may be 1.5 times thicker than a center thickness of the eighth lens 118. When expressed as an absolute value, the radius of curvature of the thirteenth surface S13 at the center may be 4 times or more, for example, in range of 4 to 6 times the radius of curvature of the fourteenth surface S14. The center thickness of the seventh lens 117 may be 1.5 times or more, for example, in a range of 1.5 to 3 times the center thickness of each of the third and fifth lenses 113 and 115.

The optical axis interval between the seventh lens 117 and the sixth lens 116 on the optical axis Lx may be greater than the optical axis interval between the seventh lens 117 and the eighth lens 118, and may be smaller than the center thickness of the seventh lens 117.

The eighth lens 118 may have negative (−) refractive power. The eighth lens 118 may include a plastic material. The eighth lens 118 may include a fifteenth surface S15 defined as an object-side surface and a sixteenth surface S16 defined as a sensor-side surface. On the optical axis, the fifteenth surface S15 may be convex and the sixteenth surface S16 may be concave. The fifteenth surface S15 and the sixteenth surface S16 may be aspherical. Each of the fifteenth surface S15 and the sixteenth surface S16 may have at least one inflection point. In detail, the fifteenth surface S15 may have an inflection point around the center, and the inflection point position of the sixteenth surface S16 with respect to the optical axis may be disposed more outside than the inflection point position of the fifteenth surface S15. there is. Here, the straight line connecting the edgeS of the object-side fifteenth surface S15 of the eighth lens 118 may be disposed between the apex of the sensor-side sixteenth surface S16 and the apex of the fifteenth surface S15 of the seventh lens 117 placed on the optical axis. Accordingly, the light incident from the eighth lens 118 may be refracted further outward with respect to the optical axis Lx. In the optical system of the invention, the number of surfaces having an inflection point among the first surface S1 to the sixteenth surface S16 may be four or five or more.

The optical filter 192 may include at least one of an infrared filter and an optical filter such as a cover glass. The optical filter 192 may pass light of a set wavelength band and filter light of a different wavelength band. When the optical filter 192 includes an infrared filter, radiant heat emitted from external light may be blocked from being transmitted to the image sensor. In addition, the optical filter 192 may transmit visible light and reflect infrared light. The image sensor 190 may detect light. The image sensor 190 may include a charge coupled device (CCD) or a complementary metal oxide semiconductor (CMOS).

A reflective member may be disposed on the incident side of the first lens 111 according to the embodiment(s) of the invention. The reflective member may reflect light incident through an optical axis perpendicular to the optical axis Lx of the first lens 111 to the eighth lens 118 toward the first lens 111. The reflective member may include a prism, that is, a triangular or right-angled prism.

The total length (TTL) of the optical system according to the first embodiment may be provided in a range of 4 mm or more, for example, in a range of 4 mm to 12 mm or 4 mm to 8 mm. The TTL is a distance from the apex of the object-side first surface S1 of the first lens 111 to the image sensor 190. The distance BFL from the apex of the sensor-side sixteenth surface S16 of the eighth lens 118 to the image sensor 190 may be 3 mm or less, for example, in a range of 0.2 mm to 3 mm or 0.2 mm to 2 mm. The vertical distance Img from the optical axis of the image sensor 190 to 1.0 field may be 0.8 mm or more, for example, 0.8 mm to 2.0 mm or 0.8 mm to 1.5 mm. The total focal length F of the optical system may be in the range of 1 mm or more, for example, 1 mm to 5 mm or 1 mm to 3 mm.

The effective focal length (EFL) of the optical system may be 1 mm or more, for example, in the range of 1 mm to 3 mm or in the range of 1 mm to 2 mm. The total F number of the optical system may be 2 or more, for example, in the range of 2 to 3 or in the range of 2 to 2.80. In the optical system, a half field of view (HFOV) may be 30 degrees or more, for example, a range of 30 degrees to 80 degrees or a range of 40 degrees to 75 degrees. An object-side entrance pupil (EPD) diameter of the optical system may be 1 mm or less, for example, in a range of 0.2 mm to 1 mm.

In the optical system of the first embodiment, all of the first to sixteenth surfaces S1 to S16 of the first to eighth lenses 111, 112, 113, 114, 115, 116, 117 and 118 may be aspherical. In each radius of curvature (changed to an absolute value) of the first to sixteenth surfaces S1-S16 about the optical axis, the number of surfaces having a radius of curvature of 5.5 mm or less may be 12 or less, and the number of surfaces having a radius of curvature exceeding 5.5 mm may be 4 or more.

In the optical system or the first to eighth lenses 111, 112, 113, 114, 115, 116, 117, and 118, on the optical axis, the number of lenses with a convex object-side surface is 4 or more, the number of lenses with a concave object-side surface is 4 or less, and the number of lenses with a convex sensor-side surface is 4 or more, and the number of lenses with a concave sensor-side surface may be 4 or less.

In the optical system or the first to eighth lenses 111, 112, 113, 114, 115, 116, 117, and 118, the number of lenses having an Abbe number of 50 or more is 5 or more, and the number of lenses having an Abbe number of less than 50 is 3 or less. For example, the Abbe's number of the first lens 111, the third lens 113, the fourth lens 114, the sixth lens 116, and the seventh lens 117 is 50 or more, The Abbe number of the second lens 112, the fifth lens 115, and the eighth lens 118 may be 35 or less, and the Abbe number of the fifth lens 115 may be the smallest among the lenses of the optical system, and may be less than 25.

In the optical system or the first to eighth lenses 111, 112, 113, 114, 115, 116, 117, and 118, the number of lenses made of a high-refractive material having a refractive index of 1.6 or higher at 587 nm (d-line) may be 3 or more, and the lenes of a low-refractive material having a refractive index of less than 1.6 may be 5 or less lenses. For example, the second, fifth, and eighth lenses 112, 115, and 118 at 587 nm have a high refractive index of 1.6 or more, and the first, third, fourth, sixth, and seventh lenses 111, 113, 114, 116, and 117 have a low refractive index of less than 1.6.

When looking at the center thickness of the first to eighth lenses 111, 112, 113, 114, 115, 116, 117, and 118, the number of lenses having a center thickness of 0.5 mm or more may be 3 or more, and the number of lenses having a center thickness of less than 0.5 mm may be 5 or less. For example, the thicknesses T1, T2, and T3 of the centers of the first to third lenses 111, 112, and 113 may satisfy the following relationship: T3<T2<T1, and the thicknesses T3, T4, T5, and T6 of the centers of the third to sixth lenses 113, 114, 115, and 116 satisfies the following relationship: T5≤T3<T6<T4, and the center thickness T3 and T4 of the third and fourth lenses 113 and 114 satisfies the following relationship: T3<T4, the center thicknesses T7 and T8 of the seventh and eighth lenses 117 and 118 may satisfy a following relationship: T8<T7<T1. Here, T1 to T8 are respective center thicknesses of the first to eighth lenses 111-118.

In the first to eighth lenses 111, 112, 113, 114, 115, 116, 117, and 118, when looking at the intervals on the optical axis between the two adjacent lenses, the following relationship is satisfied: T78<T23<T67<T12, where T67 is an optical axis interval between the adjacent sixth and seventh lenses 116 and 117, T23 is an optical axis interval between the second and third lenses 112 and 113, T78 is an optical axis interval between adjacent seventh and eighth lenses 117 and 118, and T12 is an optical axis interval between the first and second lenses 111 and 112. Here, the T12 is 0.35 mm or more and may be greater than the thickness of the center of the third and fifth lenses 113 and 115, and T23 may be 0.12 mm or less, and T67 may be greater than the optical axis interval between the fifth and sixth lenses 115 and 116. Looking at the interval between the seventh lens 117 and the eighth lens 118, the optical axis interval between two adjacent apexes on the optical axis may be smaller than the interval between two adjacent peripheral parts.

When the refractive power of each of the first to eighth lenses 111, 112, 113, 114, 115, 116, 117, and 118 is P1 to P9, when their refractive powers are expressed as absolute values, the following relationship may be satisfied: P2<P6<P3 or/and P3<P1<P5<P7<P8≤P4.

Looking at the respective focal lengths of the first to eighth lenses 111, 112, 113, 114, 115, 116, 117, and 118, the focal length of the second lens 112 may be the largest, and may be 25 mm or more, for example, in a range of 25 mm to 45 mm or 25 mm to 35 mm. The focal length of the sixth lens 116 may be smaller than the focal length of the second lens 112 and greater than the focal length of the third lens 113. The combined focal length of the first and second lenses 111 and 112 may be −3 mm or more, and the combined focal length of the third and fourth lenses 113 and 114 may be 2 mm or less. When expressed as an absolute value, the combined focal lengths of the first and second lenses 111 and 112 may be greater than the combined focal lengths of the third and fourth lenses 113 and 114.

In an edge thickness of each of the first to eighth lenses 111, 112, 113, 114, 115, 116, 117, and 118, the number of lenses having an edge thickness of 0.55 mm or more may be 2 or more, the number of lenses having an edge thickness of less than 0.55 mm may be 6 or less, and the number of lenses having an edge thickness of less than 0.3 mm may be 3 or less.

Table 1 shows values showing data of the radius of curvature, thickness, interval, refractive index, and Abbe's number of the surface of each lens of the first embodiment.

TABLE 1

| Lens | Surface | Radius (mm) of curvature | Curvature (mm) | Thickness(mm)/ Interval(mm) | Index | Abbe # |
|---|---|---|---|---|---|---|
| Lens 1 | S1 | −3.5734 | −0.2798 | 0.833 | 1.5334 | 56.5333 |
| | S2 | 6.1612 | 0.1623 | 0.467 | | |
| Lens 2 | S3 | −10.4204 | −0.0960 | 0.460 | 1.6199 | 25.5912 |
| | S4 | −7.1180 | −0.1405 | 0.095 | | |
| Lens 3 | S5 | −2.4702 | −0.4048 | 0.288 | 1.5334 | 56.5333 |
| | S6 | −1.7523 | −0.5707 | 0.043 | | |
| Aperture | Stop | Infinity | | −0.014 | | |
| Lens 4 | S7 | 6.9045 | 0.1448 | 0.599 | 1.5334 | 56.5333 |
| | S8 | −1.0485 | −0.9537 | 0.030 | | |
| Lens 5 | S9 | 3.6845 | 0.2714 | 0.220 | 1.6580 | 21.4942 |
| | S10 | 1.3646 | 0.7328 | 0.192 | | |
| Lens 6 | S11 | 2.4614 | 0.4063 | 0.418 | 1.5334 | 56.5333 |
| | S12 | 3.7199 | 0.2688 | 0.217 | | |
| Lens 7 | S13 | −4.1218 | −0.2426 | 0.556 | 1.5334 | 56.5333 |
| | S14 | −0.9034 | −1.1069 | 0.047 | | |
| Lens 8 | S15 | 1.9326 | 0.5174 | 0.349837 | 1.6199 | 25.5912 |
| | S16 | 0.6777 | 1.4756 | 0.21 | | |
| Optical filter | S17 | Infinity | | 0.11 | | |
| | S18 | Infinity | | 0.39 | | |

In Table 1, the thickness is the center thickness (mm) of each lens, and the interval is the distance (mm) between two adjacent lenses. S17 denotes the incident side surface of the optical filter, and S18 denotes the exit surface of the optical filter. Table 2 shows values showing the effective radius (Semi-Aperture), edge thickness, power value, and focal length of each lens of FIG. 1.

TABLE 2

| Lens | Surface | Semi-Aperture (mm) | Edge thickness(mm) | Power | Focal length(mm) |
|---|---|---|---|---|---|
| Lens 1 | S1 | 1.845 | 0.8091 | −0.24287 | −4.1175 |
| | S2 | 0.899 | | | |
| Lens 2 | S3 | 0.598 | 0.4755 | 0.029072 | 34.3968 |
| | S4 | 0.431 | | | |
| Lens 3 | S5 | 0.438 | 0.2642 | 0.100802 | 9.9204 |
| | S6 | 0.473 | | | |
| Aperture | Stop | 0.480 | | | |
| Lens 4 | S7 | 0.480 | 0.3719 | 0.570613 | 1.7525 |
| | S8 | 0.618 | | | |
| Lens 5 | S9 | 0.711 | 0.3878 | −0.29218 | −3.4226 |
| | S10 | 0.826 | | | |
| Lens 6 | S11 | 0.989 | 0.2235 | 0.08178 | 12.2279 |
| | S12 | 1.060 | | | |
| Lens 7 | S13 | 1.083 | 0.2274 | 0.488759 | 2.0460 |
| | S14 | 1.192 | | | |
| Lens 8 | S15 | 1.232 | 0.7756 | −0.53056 | −1.8848 |

Figure 2:
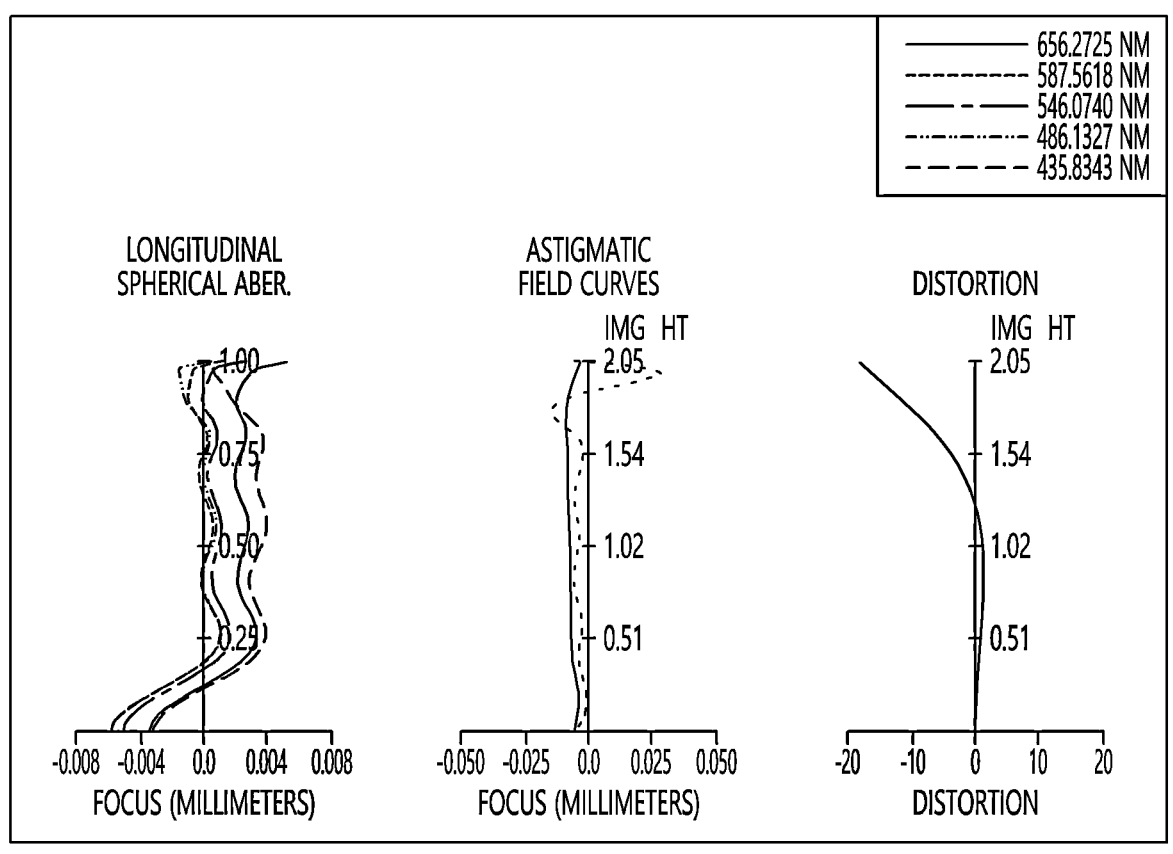
FIG. 2 is a graph showing longitudinal spherical aberration, astigmatic field curves, and distortion aberration in the optical system of FIG. 1.

FIG. 2 is an analysis graph showing longitudinal spherical aberration, astigmatism, and distortion aberration of the optical system of FIG. 1. According to the optical system according to the first embodiment, spherical aberration may be a phenomenon in which the focusing positions of light passing through different parts (e.g., the central part and the peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be exhibited, for example, for light having a wavelength of about 656.2725 nm, about 587.5618 nm, about 546.0740 nm, about 486.1327 nm, or about 435.8343 nm, respectively. It may be seen that the longitudinal spherical aberration of the optical system is limited to within +0.008 to −0.008, showing stable optical properties.

Astigmatism in the optical system is when the meridian plane (or tangential plane) and the sagittal plane of the lens have different radii, the focus of the light passing through the vertical direction and the horizontal direction may be out of focus. Astigmatism of the optical system is a result obtained at a wavelength of about 546.0740 nm. The solid line indicates astigmatism (e.g., meridional curvature) in the tangential direction, and the dotted line indicates astigmatism (e.g., spherical surface curvature) in the sagittal direction. It may be seen that the astigmatism is limited to within +0.025 to −0.025, showing stable optical properties.

According to the optical system, distortion aberration occurs because the optical magnification changes according to the distance from the optical axis (O-I), and the image formed on the actual imaging plane (e.g., 190 in FIG. 1) may appear larger or smaller than the image formed on the theoretical imaging plane. The distortion of the optical system is a result obtained at a wavelength of approximately 546.0740 nm, and the image captured through the optical system may be slightly distorted at a point deviating from the optical axis O-I. However, such distortion is generally at a level that may be seen in an optical device using a lens, and the distortion rate is less than about 3%, so that good optical properties may be provided.

Second Embodiment

Figure 3:
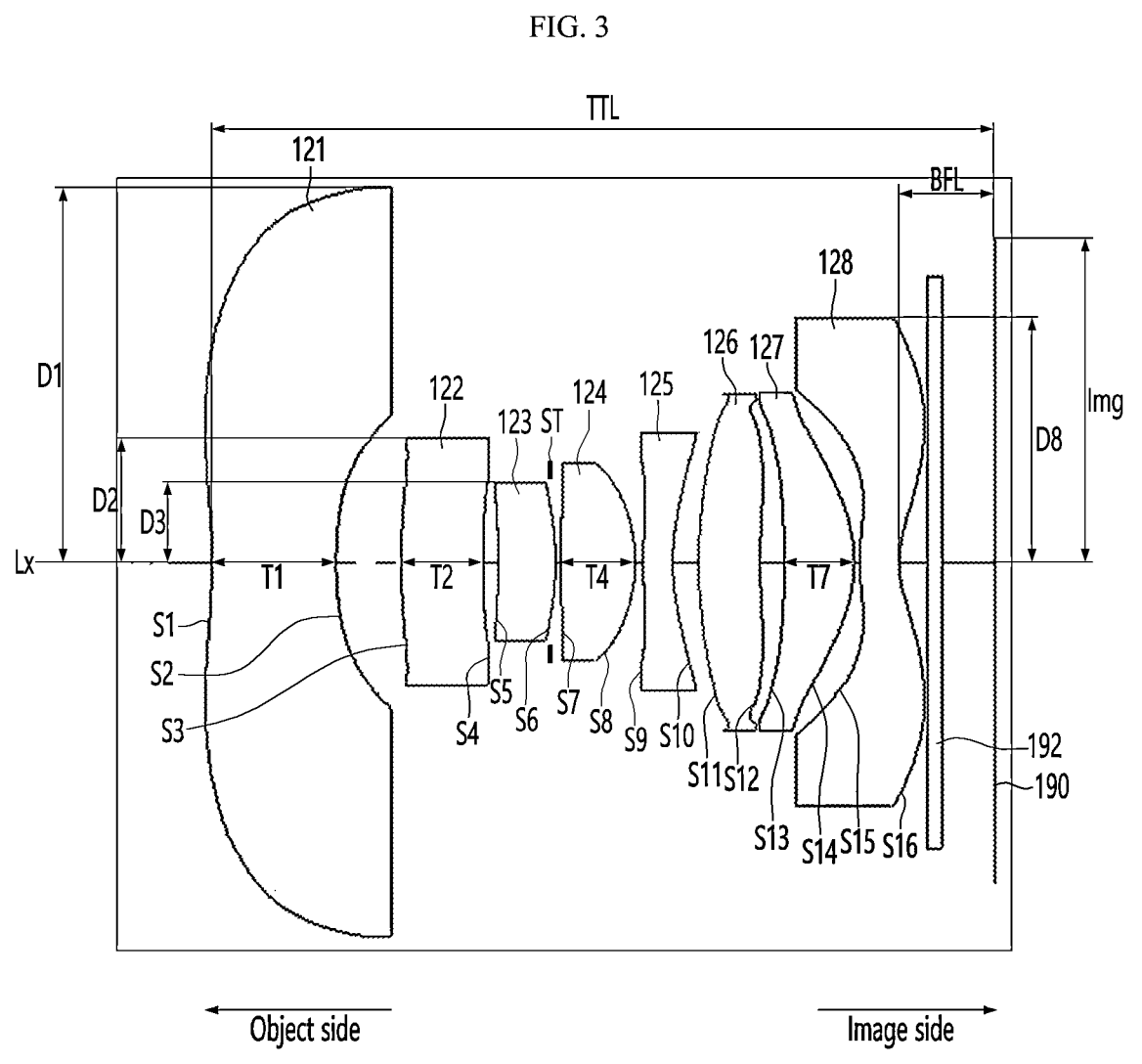
Figure 4:
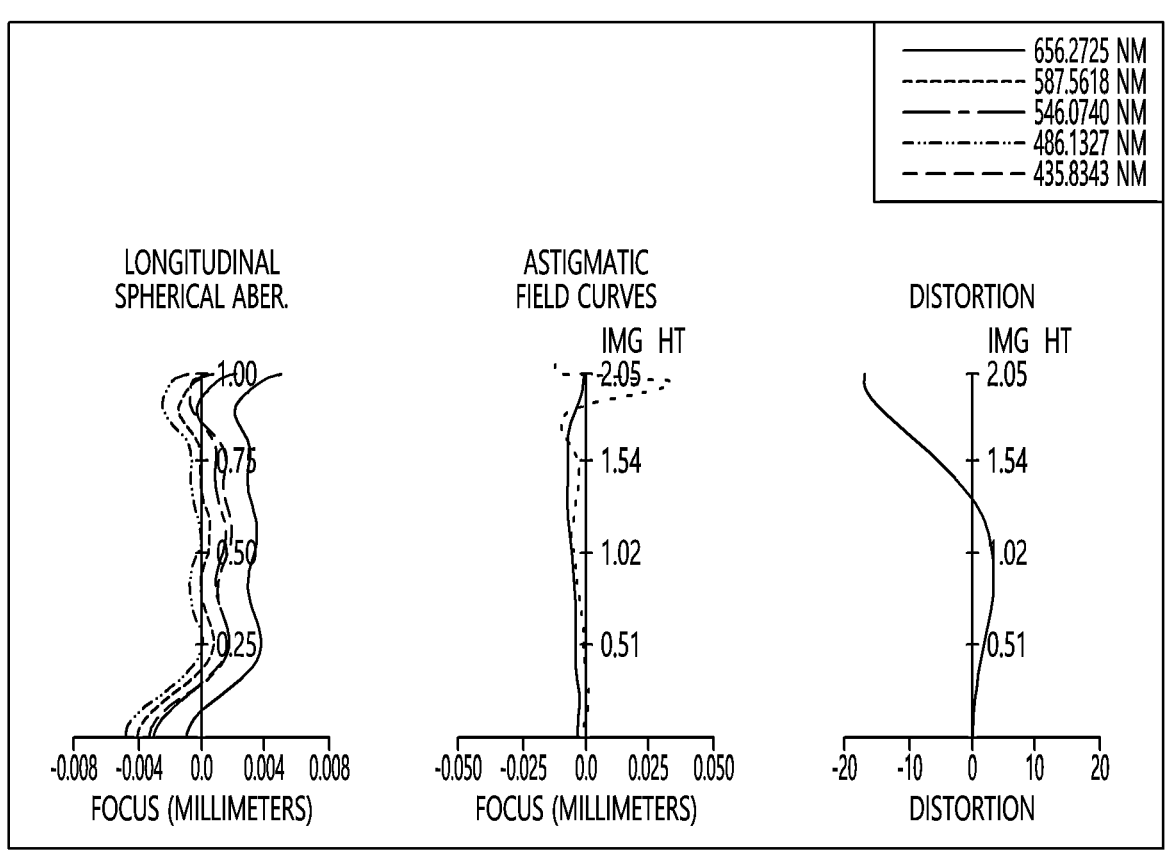
FIG. 4 is a graph showing spherical aberration, astigmatic field curves, and distortion aberration in the optical system of FIG. 3.

An optical system according to the second embodiment will be referred to with reference to FIGS. 3 and 4. In the description of the second embodiment, the same configuration as that of the first embodiment will be referred to with reference to the description of the first embodiment, and duplicate description will be omitted.

Referring to FIG. 3, in the optical system, the first lens 121 to the eighth lens 128 may be aligned along the optical axis Lx. The first lens 121 may have negative (−) refractive power. On the optical axis Lx, the first surface S1 of the first lens 121 may be concave and the second surface S2 may be concave. At least one or both of the first surface S1 and the second surface S2 of the first lens 121 may be aspherical. At least one of the first surface S1 and the second surface S2 may have an inflection point, for example, the first surface S1 may have an inflection point between the periphery of the optical axis and an edge of the first surface S1. The size of the effective diameter of the object-side surface or the sensor-side surface of the first lens 121 may be greater than the size of the effective diameter of the object-side surface or the sensor-side surface of the second lens 122 or the third lens 123. Here, the effective diameter may be the diameter of the effective region of the object-side surface or the sensor-side surface on which light is incident.

The second lens 122 may have positive (+) refractive power. On the optical axis Lx, the third surface S3 of the second lens 122 may be convex and the fourth surface S4 may be concave. That is, the second lens 122 may have a meniscus shape convex toward the image side. At least one or both of the third surface S3 and the fourth surface S4 may be aspherical. As another example, the second lens 122 may have negative refractive power, the third surface S3 may be concave or planar, and the fourth surface S4 may be convex or planar. there is. At least one of the third surface S3 and the fourth surface S4 may have an inflection point, for example, the third surface S3 may have an inflection point between the edge and the periphery of the optical axis of the third surface S3.

Here, a center thickness of the first lens 121 may be greater than a center thickness of each of the second and third lenses 122 and 123. The center thickness of the first lens 121 may be 1.2 times or more, for example, in a range of 1.2 times to 2.2 times the center thickness of the second lens 122. The thickness of the center of the first lens 121 may be 1.8 times or more, for example, in the range of 1.8 times to 3 times or the range of 2 times to 3 times the thickness of the center of the third lens 123. Here, the center thickness of the first lens 121 may be the largest among the center thicknesses of the lenses of the optical system, and may be 0.7 mm or more, for example, in the range of 0.7 mm to 1.2 mm. The center thickness of the first lens 121 may be equal to or smaller than the sum of the center thicknesses of the second lens 122 and the third lens 123.

The optical axis interval between the first lens 121 and the second lens 122 may be the largest among the two adjacent lenses, and may be, for example, 40% or more of the center thickness of the second lens 122, for example, in the range of 40%. to 80%. A difference between an optical axis interval between the first lens 121 and the second lens 122 and a center thickness of the second lens 122 may be 0.2 mm or more. The optical axis interval between the first lens 121 and the second lens 122 may be 0.40 mm or more, for example, in the range of 0.40 mm to 0.65 mm.

The third lens 123 may have positive (+) refractive power. On the optical axis, the fifth surface S5 of the third lens 123 may be concave and the sixth surface S8 may be convex. That is, the third lens 123 may have a meniscus shape convex toward the image side. At least one or both of the fifth surface S5 and the sixth surface S6 may be aspherical. As another example, the third lens 123 may have negative refractive power, the fifth surface S5 may be convex or planar, and the sixth surface S6 may be concave or planar.

The optical axis interval between the second lens 122 and the third lens 123 may be smaller than the optical axis interval between the first and second lenses 121 and 122 and may be greater than the optical axis interval between the third and fourth lenses 123 and 124. The optical axis interval between the second lens 122 and the third lens 123 may be smaller than the optical axis interval between the fifth and sixth lenses 125 and 126, smaller than the optical axis interval between the sixth and seventh lenses 126 and 127, and greater than the optical axis interval between the seventh and eighth lenses 127 and 128.

The fourth lens 124 may have positive (+) refractive power. On the optical axis, the seventh surface S7 of the fourth lens 124 may be convex, and the eighth surface S8 may be convex. At least one or both of the seventh surface S7 and the eighth surface S8 may be aspherical. Both surfaces of the fourth lens 124 may be convex, and when expressed as an absolute value, the radius of curvature of the seventh surface S7 at the center may be greater than the radius of curvature of the eighth surface S8, and may be 5.5 mm or more, for example, in the range of 5.5 mm to 8 mm. The radius of curvature of the seventh surface S7 at the center may be smaller than the radius of curvature of the third surface S3, and the difference between the radius of curvature of the seventh surface S7 and the radius of curvature of the second surface S7 may be 3 mm or less. Here, the center thickness of the fourth lens 124 may be smaller than the center thickness of the second lens 122, and may be 0.45 mm or more, for example, in the range of 0.45 mm to 0.7 mm. The difference between the center thickness of the fourth lens 124 and the center thickness of the seventh lens 127 may be 0.1 mm or less, for example, in the range of 0.005 mm to 0.1 mm. The center thickness of the fourth lens 124 may be smaller than the sum of the center thicknesses of the third lens 123 and the fifth lens 125.

The fifth lens 125 may have negative (−) refractive power. On the optical axis, the ninth surface S9 of the fifth lens 125 may be convex and the tenth surface S10 may be concave. The ninth surface S9 may have at least one inflection point around the center. At least one or both of the ninth surface S9 and the tenth surface S10 may be aspherical. As another example, the ninth surface S10 of the fifth lens 125 may be flat or concave.

Here, based on the third lens 123, the effective diameter of the object-side or sensor-side surface becomes smaller in the order of the first lens 121, the second lens 122, and the third lens 123. With respect to the third lens 123, the effective diameter of the object-side or sensor-side surface may increase in the order of the third lens 123, the fourth lens 124, the fifth lens 125, and the sixth lens 126. In addition, the effective diameter of the object-side or sensor-side surface of the seventh lens 127 may be greater than the effective diameter of each surface of the sixth lens 126 and smaller than the effective diameter of each surface of the eighth lens 128.

The sixth lens 126 may have positive (+) refractive power. On the optical axis, the eleventh surface S11 of the sixth lens 126 may be convex and the twelfth surface S12 may be concave. The eleventh surface S11 and the twelfth surface S12 may be aspherical. The twelfth surface S12 may have at least one inflection point around the center. The inflection point may be disposed closer to the edge than to the optical axis or the center. As another example, the sixth lens 126 may have negative refractive power, the eleventh surface S11 may be flat or concave, and the twelfth surface S12 may be flat or convex.

A center thickness of the sixth lens 126 may be thicker than a center thickness of the fifth lens 125, and may be thinner than a center thickness of the seventh lens 127. When the absolute value is expressed, the radius of curvature of the eleventh surface S11 at the center is greater than the radius of curvature of the tenth surface S10 of the fifth lens 125, and may be greater than the radius of curvature of the fourteenth surface S14. When the absolute value is expressed, the radius of curvature of the twelfth surface S12 at the center is greater than the radius of curvature of each of the tenth surface S10 and the eleventh surface S11, and may be smaller than the radius of the curvature of the thirteenth surface S13 of the seventh lens 127.

The seventh lens 127 may have positive (+) refractive power. On the optical axis Lx, the thirteenth surface S13 of the seventh lens 127 may be concave and the fourteenth surface S14 may be convex. That is, the seventh lens 127 may have a meniscus shape convex toward the sensor side. At least one or both of the thirteenth surface S13 and the fourteenth surface S14 may be aspherical. As another example, the thirteenth surface S13 may be flat or convex.

A center thickness of the seventh lens 127 may be greater than a center thickness of the sixth lens 126 and may be 1.3 times thicker than a center thickness of the eighth lens 128. When expressed as an absolute value, the radius of curvature of the thirteenth surface S13 at the center may be 4 times or more, for example, in the range of 4 to 6 times the radius of curvature of the 14th surface S14. The center thickness of the seventh lens 127 may be 1.5 times or more, for example, 1.5 to 3 times the center thickness of the fifth lens 125.

The optical axis interval between the seventh lens 127 and the sixth lens 126 on the optical axis Lx may be greater than the optical axis interval between the seventh lens 127 and the eighth lens 128, and may be smaller than the center thickness of the seventh lens 127.

The eighth lens 128 may have negative (−) refractive power. On the optical axis, the fifteenth surface S15 of the eighth lens 128 may be convex and the sixteenth surface S16 may be concave. The fifteenth surface S15 and the sixteenth surface S16 may be aspherical. Each of the fifteenth surface S15 and the sixteenth surface S16 may have at least one inflection point. In detail, the fifteenth surface S15 may have an inflection point around the center, and the inflection point position of the sixteenth surface S16 with respect to the optical axis may be disposed more outside than the inflection point position of the fifteenth surface S15. Here, the straight line connecting the edges of the object-side fifteenth surface S15 of the eighth lens 128 may be disposed between the apex of the sensor-side sixteenth surface S16 and the apex of the fifteenth surface S15 of the seventh lens 127 placed on the optical axis. Accordingly, the light incident from the eighth lens 128 may be refracted further outward with respect to the optical axis Lx.

The optical filter 192 and the image sensor 190 will be described with reference to the first embodiment. The total length (TTL) of the optical system according to the second embodiment may be provided in a range of 4 mm or more, for example, 4 mm to 12 mm or 4 mm to 8 mm. The distance BFL from the apex of the sensor-side sixteenth surface S16 of the eighth lens 128 to the image sensor 190 may be 3 mm or less, for example, in a range of 0.2 mm to 3 mm or 0.2 mm to 2 mm. The vertical distance Img from the optical axis of the image sensor 190 to 1.0 field may be 0.8 mm or more, for example, in the range of 0.8 mm to 2.0 mm or 0.8 mm to 1.5 mm. The total focal length F of the optical system may be in the range of 1 mm or more, for example, 1 mm to 5 mm or 1 mm to 3 mm.

The effective focal length (EFL) of the optical system may be 1 mm or more, for example, in the range of 1 mm to 3 mm or in the range of 1 mm to 2 mm. The total F number of the optical system may be 2 or more, for example, in the range of 2 to 3 or in the range of 2 to 2.80. In the optical system, a half field of view (HFOV) may be 30 degrees or more, for example, in the range of 30 degrees to 80 degrees or 40 degrees to 75 degrees. An object-side entrance pupil (EPD) diameter of the optical system may be 1 mm or less, for example, in the range of 0.2 mm to 1 mm. The combined focal length of the first and second lenses 121 and 122 may be −2.5 mm or more, and the combined focal length of the third and fourth lenses 123 and 124 may be 2 mm or less. When expressed as an absolute value, the combined focal lengths of the first and second lenses 121 and 122 may be greater than the combined focal lengths of the third and fourth lenses 123 and 124.

In the optical system of the second embodiment, all of the first to sixteenth surfaces S1 to S16 of the first to eighth lenses 121, 122, 123, 124, 125, 126, 127 and 128 may be aspherical. In each radius of curvature (changed to an absolute value) of the first to sixteenth surfaces S1-S16 on the optical axis, the number of surfaces having a radius of curvature of 5.5 mm or less may be 12 or less, and the number of surfaces having a radius of curvature exceeding 5.5 mm may be 4 or more among the object-side and sensor-side surfaces.

In the optical system or the first to eighth lenses 121, 122, 123, 124, 125, 126, 127, 128 according to the second embodiment, the number of lenses having a convex object-side surface on the optical axis is 5 or more, and the number of lenses having a concave object-side surface is 3 or less, the number of the lenses having a convex sensor-side surface may be 3 or more, and the number of lenses having a concave sensor-side surface may be 5 or less.

In the optical system or the first to eighth lenses 121, 122, 123, 124, 125, 126, 127 and 128, the number of lenses having an Abbe number of 50 or more may be 5 or more, and the number of lenses having an Abbe number of less than 50 may be 3 or less. For example, the Abbe number of the first lens 121, the third lens 123, the fourth lens 124, the sixth lens 126, and the seventh lens 127 is 50 or more, The Abbe number of the second lens 122, the fifth lens 125, and the eighth lens 128 may be 35 or less, and the Abbe number of the fifth lens 125 may be the smallest among the lenses of the optical system, and may be less than 25.

In the optical system or the first to eighth lenses 121, 122, 123, 124, 125, 126, 127, and 128, the number of lenses made of a high refractive material having a refractive index of 1.6 or more at 587 nm is three or more, and the lenses made of a low refractive material having a refractive index of less than 1.6 may be 5 or less lenses. For example, at 587 nm, the second, fifth, and eighth lenses 122, 125, and 128 have a high refractive index of 1.6 or more, and the first, third, fourth, sixth, and seventh lenses 121, 123, 124, 126, and 127 have a low refractive index of less than 1.6.

In the optical system or the first to eighth lenses 121, 122, 123, 124, 125, 126, 127 and 128, the number of lenses having a center thickness of 0.5 mm or more may be 4 or more, and the number of lenses having a center thickness of less than 0.5 mm may be 4 or less. For example, the thicknesses T1, T2, and T3 of the centers of the first to third lenses 122, 122, and 123 may satisfy the following relationship: T3<T2<T1, and the thicknesses T3, T4, T5, and T6 of the centers of the third to sixth lenses 123, 124, 125, and 126 may be satisfied the following condition: T5<T3≤T6<T4, and the center thicknesses T3 and T4 of the third and fourth lenses 123 and 124 satisfy the following relationship: T3<T4, and the center thicknesses T7 and T8 of the seventh eighth lens 128, the optical axis interval between two adjacent apexes on the optical axis may be smaller than the interval between the two adjacent peripheral parts.

When the refractive power of each of the first to eighth lenses 121, 122, 123, 124, 125, 126, 127, and 128 is P1 to P9, when their refractive powers are expressed as absolute values, the following relationship may be satisfied: P2≤P6<P3 or/and P3<P1<P5<P7≤P8≤P4.

Looking at the respective focal lengths of the first to eighth lenses 121, 122, 123, 124, 125, 126, 127, and 128, the focal length of the second lens 122 may be the largest, and may be in the range of 12 mm or more, for example, in the range of 12 mm to 30 mm or 12 mm to 20 mm. The focal length of the sixth lens 126 may be smaller than the focal length of the second lens 122 and greater than the focal length of the third lens 123.

In an edge thickness of each of the first to eighth lenses 121, 122, 123, 124, 125, 126, 127, and 128, the number of lenses having an edge thickness of 0.50 mm or more may be 3 or more, the number of lenses having an edge thickness of less than 0.50 mm may be 6 or less, and the number of lenses having an edge thickness of less than 0.3 mm may be 2 or less.

Table 3 below shows data showing the radius of curvature, thickness, interval, refractive index, and Abbe's number of the surface of each lens of the second embodiment shown in FIG. 3.

TABLE 3

| Lens | Surface | Radius (mm) of curvature | Curvature (mm) | Thickness(mm)/ Interval(mm) | Index | Abbe # |
|---|---|---|---|---|---|---|
| Lens 1 | S1 | −3.6308 | −0.2754 | 0.927 | 1.5334 | 56.5333 |
|  | S2 | 2.6824 | 0.3728 | 0.486 |  |  |
| Lens 2 | S3 | 4.0663 | 0.2459 | 0.609 | 1.6199 | 25.5912 |
|  | S4 | 5.9982 | 0.1667 | 0.116 |  |  |
| Lens 3 | S5 | −4.5392 | −0.2203 | 0.427 | 1.5334 | 56.5333 |
|  | S6 | −1.8784 | −0.5324 | 0.054 |  |  |
| Aperture | Stop | Infinity |  | −0.014 |  |  |
| Lens 4 | S7 | 6.9045 | 0.1448 | 0.555 | 1.5334 | 56.5333 |
|  | S8 | −1.0386 | −0.9628 | 0.030 |  |  |
| Lens 5 | S9 | 4.2858 | 0.2333 | 0.220 | 1.6580 | 21.4942 |
|  | S10 | 1.4037 | 0.7124 | 0.192 |  |  |
| Lens 6 | S11 | 2.4209 | 0.4131 | 0.458 | 1.5334 | 56.5333 |
|  | S12 | 3.5670 | 0.2803 | 0.182 |  |  |
| Lens 7 | S13 | −4.1632 | −0.2402 | 0.522 | 1.5334 | 56.5333 |
|  | S14 | −0.8890 | −1.1249 | 0.041 |  |  |
| Lens 8 | S15 | 1.3885 | 0.7202 | 0.291661 | 1.6199 | 25.5912 |
|  | S16 | 0.6022 | 1.6606 | 0.21 |  |  |
| Optical filter | S17 | Infinity |  | 0.11 |  |  |
|  | S18 | Infinity |  | 0.40 |  |  | and eighth lenses 127 and 128 may satisfy a following relationship: T8<T7<T1. Here, T1 to T8 are respective center thicknesses of the first to eighth lenses 121-128.

When looking at the intervals on the optical axis between the two adjacent lenses in the first to eighth lenses 121, 122, 123, 124, 125, 126, 127, and 128, the following relationship is satisfied: T78<T23<T67<T12, where T67 is an optical axis interval between the adjacent sixth and seventh lenses 126 and 127, T23 is an optical axis interval between the second and third lenses 122 and 123, T78 is an optical axis interval between the adjacent seventh and eighth lenses 127 and 128, and T12 is an optical axis interval between the first and second lenses 121 and 122. Here, the T12 may be 0.35 mm or more and may be greater than the center thickness of the fifth lens 125. The T23 is 0.20 mm or less, and the optical axis interval T67 between the sixth and seventh lenses 126 and 127 may be equal to or greater than the optical axis interval between the fifth and sixth lenses 125 and 126. Looking at the interval between the seventh lens 127 and the In Table 3, the thickness is the center thickness (mm) of each lens of FIG. 3, and the interval is the distance (mm) between two adjacent lenses. S17 denotes the incident side surface of the optical filter, and S18 denotes the exit surface of the optical filter. Table 4 shows the effective radius (Semi-Aperture), edge thickness, power value, and focal length of each lens of FIG. 3.

TABLE 4

| Lens | Surface | Semi-Aperture (mm) | Edge thickness(mm) | Power | Focal length(mm) |
|---|---|---|---|---|---|
| Lens 1 | S1 | 2.351 | 0.8091 | −0.3634 | −2.7516 |
|  | S2 | 0.970 |  |  |  |
| Lens 2 | S3 | 0.774 | 0.4755 | 0.05503 | 18.1716 |
|  | S4 | 0.527 |  |  |  |

TABLE 4-continued

| Lens | Sur-face | Semi-Aperture (mm) | Edge thickness(mm) | Power | Focal length(mm) |
|------|------|------|------|------|------|
| Lens 3 | S5 | 0.498 | 0.2642 | 0.17575 | 5.6899 |
| | S6 | 0.464 | | | |
| Aperture | Stop | 0.460 | | | |
| Lens 4 | S7 | 0.460 | 0.3719 | 0.57647 | 1.7347 |
| | S8 | 0.619 | | | |
| Lens 5 | S9 | 0.701 | 0.3878 | −0.3057 | −3.2715 |
| | S10 | 0.810 | | | |
| Lens 6 | S11 | 1.012 | 0.2235 | 0.08064 | 12.4014 |
| | S12 | 1.063 | | | |
| Lens 7 | S13 | 1.090 | 0.2274 | 0.49808 | 2.0077 |
| | S14 | 1.167 | | | |
| Lens 8 | S15 | 1.179 | 0.7756 | −0.5002 | −1.9994 |
| | S16 | 1.68 | | | |

FIG. 4 is an analysis graph showing longitudinal spherical aberration, astigmatism, and distortion aberration of the optical system of FIG. 3. According to the optical system according to the second embodiment, spherical aberration may be a phenomenon in which the focusing positions of light passing through different parts (e.g., the central part and the peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be exhibited, for example, for light having a wavelength of about 656.2725 nm, about 587.5618 nm, about 546.0740 nm, about 486.1327 nm, or about 435.8343 nm, respectively. It may be seen that the longitudinal spherical aberration of the optical system is limited to within +0.025 to −0.025, showing stable optical properties. Astigmatism in the optical system is when the meridian plane (or tangential plane) and the sagittal plane of the lens have different radii, the focus of the light passing through vertical direction and the horizontal direction may be out of focus. Astigmatism of the optical system is a result obtained at a wavelength of about 546.0740 nm. The solid line indicates astigmatism (e.g., meridional curvature) in the tangential direction, and the dotted line indicates astigmatism (e.g., spherical surface curvature) in the sagittal direction. As can be seen from FIG. 4, it may be confirmed that the astigmatism is limited to within +0.050 to −0.050 to show stable optical properties.

According to the optical system, distortion aberration occurs because the optical magnification changes according to the distance from the optical axis (O-I), and the image formed on the actual imaging plane (e.g., 190 in FIG. 1) may appear larger or smaller than the image formed on the theoretical imaging plane. The distortion of the optical system is a result obtained at a wavelength of approximately 546.0740 nm, and the image captured through the optical system may be slightly distorted at a point deviating from the optical axis O-I. However, such distortion is generally at a level that may be seen in an optical device using a lens, and the distortion rate is less than about 3%, so that good optical properties may be provided.

Third Embodiment

Figure 5:
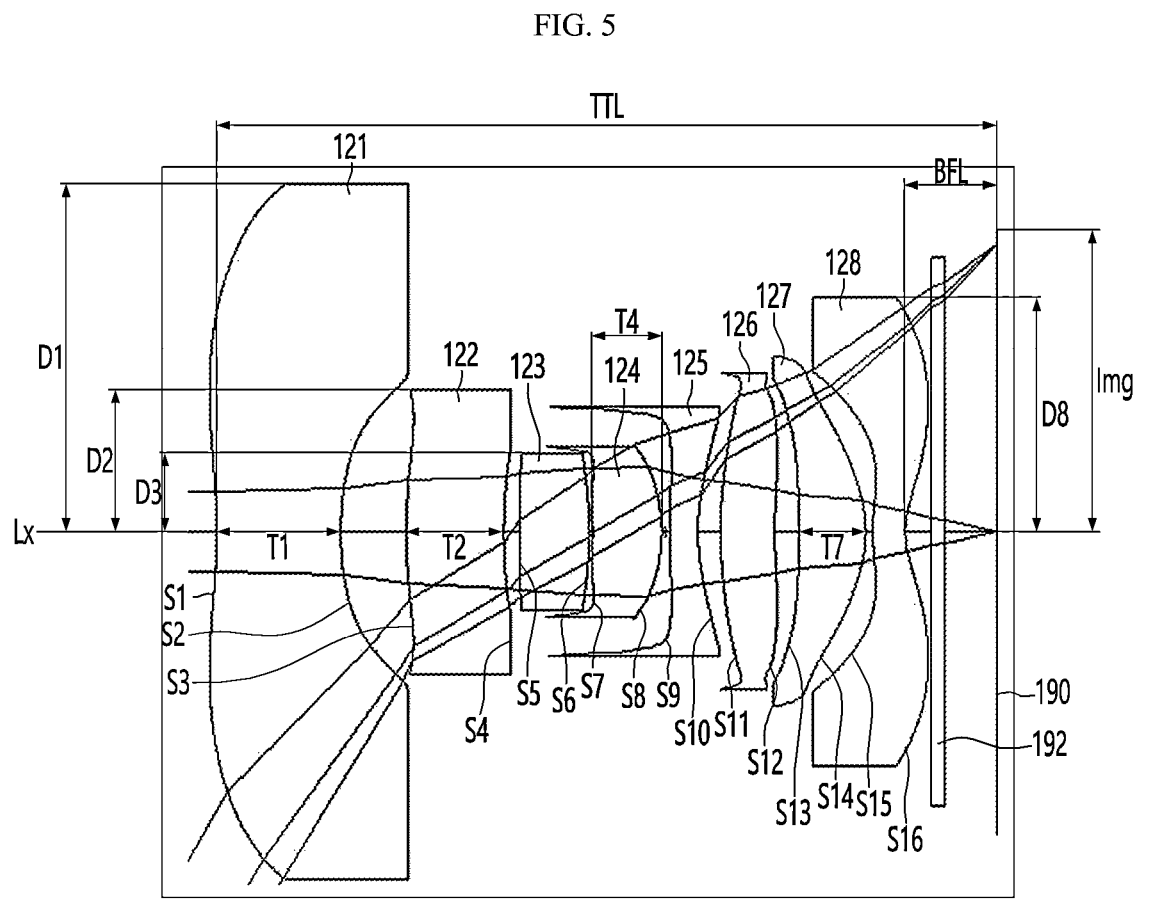
Figure 6:
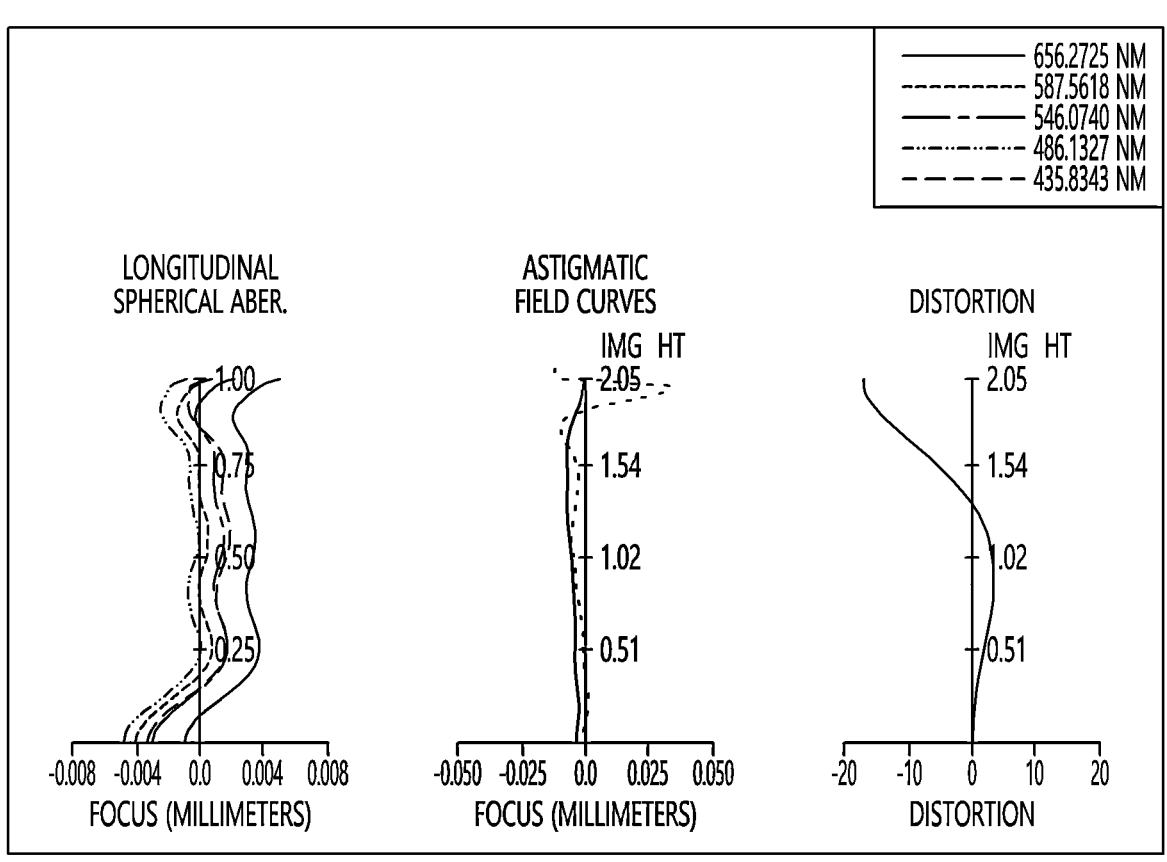
FIG. 6 is a graph showing spherical aberration, astigmatic field curves, and distortion aberration in the optical system of FIG. 5.

The optical system according to the third embodiment will be referred to FIGS. 5 and 6. In the description of the third embodiment, the same configuration as that of the first and second embodiments will be referred to, and repeated description will be omitted. Referring to FIG. 5, in the optical system according to the third embodiment, the first lens 131 may have negative (−) refractive power. On the optical axis, the first surface S1 of the first lens 131 may be concave and the second surface S2 may be concave. At least one or both of the first surface S1 and the second surface S2 of the first lens 131 may be aspherical. At least one of the first surface S1 and the second surface S2 may have an inflection point, for example, the first surface S1 may have an inflection point between the periphery of the optical axis and an edge of the first surface S1. The size of the effective diameter of the object-side surface or the sensor-side surface of the first lens 131 may be greater than the size of the effective diameter of the object-side surface or the sensor-side surface of the second lens 132 or the third lens 133. Here, the effective diameter may be the diameter of the effective region of the object-side surface or the sensor-side surface on which light is incident.

The second lens 132 may have positive (+) refractive power. On the optical axis, the third surface S3 of the second lens 132 may be convex and the fourth surface S4 may be concave. That is, the second lens 132 may have a meniscus shape convex toward the image side. At least one or both of the third surface S3 and the fourth surface S4 may be aspherical. As another example, the second lens 132 may have negative refractive power, the third surface S3 may be concave or planar, and the fourth surface S4 may be convex or planar.

Here, a center thickness of the first lens 131 may be greater than a center thickness of each of the second and third lenses 132 and 133. The center thickness of the first lens 131 may be greater than 1 time the center thickness of the second lens 132, for example, in the range of 1.2 times to 2 times. The thickness of the center of the first lens 131 may be 1.5 times or more of the thickness of the center of the third lens 133, for example, in the range of 1.5 times to 2.5 times, or in the range of 1.5 times to 2.2 times. Here, the center thickness of the first lens 131 may be the largest among the center thicknesses of the lenses of the optical system, and may be 0.7 mm or more, for example, in the range of 0.7 mm to 1.2 mm. The center thickness of the first lens 131 may be smaller than the sum of the center thicknesses of the second lens 132 and the third lens 133.

The optical axis interval between the first lens 131 and the second lens 132 may be the largest among the intervals between the two adjacent lenses, and may be, for example, 50% or more of the center thickness of the second lens 132, for example, in the range of 50%. to 90%. A difference between an optical axis interval between the first lens 131 and the second lens 132 and a center thickness of the second lens 132 may be 0.4 mm or less. The optical axis interval between the first lens 131 and the second lens 132 may be 0.35 mm or more, for example, in the range of 0.35 mm to 0.75 mm.

The third lens 133 may have positive (+) refractive power. On the optical axis, the fifth surface S5 of the third lens 133 may be convex and the sixth surface S8 may be convex. At least one or both of the fifth surface S5 and the sixth surface S6 may be aspherical. As another example, the third lens 133 may have negative refractive power, the fifth surface S5 may be convex or planar, and the sixth surface S6 may be concave or planar.

The optical axis interval between the second lens 132 and the third lens 133 may be smaller than the optical axis interval between the first and second lenses 131 and 132 and may be greater than the optical axis interval between the third and fourth lenses 133 and 134. The optical axis interval between the second lens 132 and the third lens 133 is smaller than the optical axis interval between the fifth and sixth lenses 135 and 136, smaller than the optical axis interval between the sixth and seventh lenses 136 and 137, and an interval between the seventh lens 137 and the eighth lens 138 may be greater than the optical axis interval.

The fourth lens 134 may have positive (+) refractive power. On the optical axis, the seventh surface S7 of the fourth lens 134 may be convex, and the eighth surface S8 may be convex. At least one or both of the seventh surface S7 and the eighth surface S8 may be aspherical. Both surfaces of the fourth lens 134 may be convex, and when expressed as an absolute value, the radius of curvature of the seventh surface S7 at the center may be greater than the radius of curvature of the eighth surface S8, and may be 5.5 mm or more, for example, in the range of 5.5 mm to 8 mm. At the center, the radius of curvature of the seventh surface S7 may be greater than the radius of curvature of the third surface S3, and the difference between the radius of curvature of the seventh surface S7 and the radius of curvature of the second surface S7 may be 2 mm or more. Here, the center thickness of the fourth lens 134 may be smaller than the center thickness of the second lens 132, and may be 0.45 mm or less, for example, in the range of 0.45 mm to 0.7 mm. The difference between the center thickness of the fourth lens 134 and the center thickness of the seventh lens 137 may be 0.1 mm or less, for example, in the range of 0.005 mm to 0.1 mm. The center thickness of the fourth lens 134 may be greater than the sum of the center thicknesses of the fifth lens 135 and the eighth lens 138.

The fifth lens 135 may have negative (−) refractive power. On the optical axis, the ninth surface S9 of the fifth lens 135 may be convex and the tenth surface S10 may be concave. The ninth surface S9 may have at least one inflection point around the center. At least one or both of the ninth surface S9 and the tenth surface S10 may be aspherical. As another example, the ninth surface S9 of the fifth lens 135 may be flat or concave.

Here, based on the third lens 133, the effective diameter of the object-side or sensor-side surface becomes smaller in the order of the first lens 131, the second lens 132, and the third lens 133. With respect to the third lens 133, the effective diameter of the object-side or sensor-side surface may increase in the order of the third lens 133, the fourth lens 134, the fifth lens 135 and the sixth lens 136. In addition, the effective diameter of the object-side or sensor-side surface of the seventh lens 137 may be greater than the effective diameter of each surface of the sixth lens 136 and may be smaller than the effective diameter of each surface of the eighth lens 138.

The sixth lens 136 may have positive (+) refractive power. On the optical axis, the eleventh surface S11 of the sixth lens 136 may be convex and the twelfth surface S12 may be concave. The eleventh surface S11 and the twelfth surface S12 may be aspherical. The twelfth surface S12 may have at least one inflection point around the center. The inflection point may be disposed closer to the edge than to the optical axis or the center. As another example, the sixth lens 136 may have negative refractive power, the eleventh surface S11 may be flat or concave, and the twelfth surface S12 may be flat or convex.

A center thickness of the sixth lens 136 may be thicker than a center thickness of the fifth lens 135, and may be thinner than a center thickness of the seventh lens 137. When the absolute value is expressed, the radius of curvature of the eleventh surface S11 at the center is greater than the radius of curvature of the tenth surface S10 of the fifth lens 125, and may be greater than the radius of curvature of fourteenth surface S14 of the seventh lens 137. When the absolute value is expressed, the radius of curvature of the twelfth surface S12 at the center is greater than the respective radii of curvature of the tenth surface S10 and the eleventh surface S11, and may be smaller than the radius of curvature of the thirteenth surface S13 of the seventh lens 137.

The seventh lens 137 may have positive (+) refractive power. On the optical axis Lx, the thirteenth surface S13 of the seventh lens 137 may be concave and the fourteenth surface S14 may be convex. That is, the seventh lens 137 may have a meniscus shape convex toward the sensor side. At least one or both of the thirteenth surface S13 and the fourteenth surface S14 may be aspherical. As another example, the thirteenth surface S13 may be flat or convex.

A center thickness of the seventh lens 137 may be greater than a center thickness of the sixth lens 136 and 1.3 times thicker than a center thickness of the eighth lens 138. When expressed as an absolute value, the radius of curvature of the thirteenth surface S13 at the center may be 4 times or more, for example, in a range of 4 to 6 times the radius of curvature of the 14th surface S14. The center thickness of the seventh lens 137 may be 1.5 times or more, for example, in the range of 1.5 to 3 times the center thickness of the fifth lens 135.

The optical axis interval between the seventh lens 137 and the sixth lens 136 on the optical axis Lx may be greater than the optical axis interval between the seventh lens 137 and the eighth lens 138 and may be smaller than the center thickness of the seventh lens 133.

The eighth lens 138 may have negative (−) refractive power. On the optical axis, the fifteenth surface S15 of the eighth lens 138 may be convex and the sixteenth surface S16 may be concave. The fifteenth surface S15 and the sixteenth surface S16 may be aspherical. Each of the fifteenth surface S15 and the sixteenth surface S16 may have at least one inflection point. In detail, the fifteenth surface S15 may have an inflection point around the center, and the inflection point position of the sixteenth surface S16 with respect to the optical axis may be disposed more outside than the inflection point position of the fifteenth surface S15. Here, the straight line connecting the edges of the object-side fifteenth surface S15 of the eighth lens 138 may be disposed between the apex of the sensor-side sixteenth surface S16 and the apex of the fifteenth surface S15 of the seventh lens 137 placed on the optical axis. Accordingly, the light incident from the eighth lens 138 may be refracted further outward with respect to the optical axis Lx.

The optical filter 192 and the image sensor 190 will be described with reference to the first embodiment. The total length (TTL) of the optical system according to the third embodiment may be provided in a range of 4 mm or more, for example, 4 mm to 12 mm or 4 mm to 8 mm. The distance BFL from the apex of the sensor-side sixteenth surface S16 of the eighth lens 138 to the image sensor 190 may be 3 mm or less, for example, in the range of 0.2 mm to 3 mm or 0.2 mm to 2 mm. The vertical distance Img from the optical axis of the image sensor 190 to 1.0 field may be 0.8 mm or more, for example, in the range of 0.8 mm to 2.0 mm or 0.8 mm to 1.5 mm. The total focal length F of the optical system may be in the range of 1 mm or more, for example, 1 mm to 5 mm or 1 mm to 3 mm.

The effective focal length (EFL) of the optical system may be 1 mm or more, for example, in the range of 1 mm to 3 mm or in the range of 1 mm to 2 mm. The total F number of the optical system may be 2 or more, for example, in the range of 2 to 3 or in the range of 2 to 2.80. In the optical system, a half field of view (HFOV) may be 30 degrees or more, for example, a range of 30 degrees to 80 degrees or 40 degrees to 75 degrees. An object-side entrance pupil (EPD) diameter of the optical system may be 1 mm or less, for example, in the range of 0.2 mm to 1 mm. The combined focal length of the first and second lenses 121 and 122 may be –2 mm or more, and the combined focal length of the third and fourth lenses 123 and 124 may be less than 2 mm. When expressed as an absolute value, the combined focal lengths of the first and second lenses 121 and 122 may be greater than the combined focal lengths of the third and fourth lenses 123 and 124.

In the optical system of the third embodiment, all of the first to sixteenth surfaces S1 to S16 of the first to eighth lenses 131, 132, 133, 134, 135, 136, 137 and 138 may be aspherical. In each radius of curvature (changed to an absolute value) of the first to sixteenth surfaces S1-S16 about the optical axis, the number of surfaces having a radius of curvature of 5.5 mm or less may be 14 or less, and the number of the surfaces having the curvature exceeding 5.5 mm may be 2 or more.

In the optical system or the first to eighth lenses 131, 132, 133, 134, 135, 136, 137, and 138, on the optical axis, the number of the lenses having a convex object-side surface may be 5 or more, the number of the lenses having a concave object-side surface may be 3 or less, and the number of lenses having a convex sensor-side surface may be 4 or more, and the number of lenses having a concave sensor-side surface may be 4 or less.

In the optical system or the first to eighth lenses 131, 132, 133, 134, 135, 136, 137 and 138, the number of lenses having an Abbe number of 50 or more may be 5 or more, and the number of lenses having an Abbe number of less than 50 may be 3 or less. For example, the Abbe's number of the first lens 131, the third lens 133, the fourth lens 134, the sixth lens 136, and the seventh lens 137 is 50 or more, The Abbe number of the second lens 132, the fifth lens 135, and the eighth lens 138 may be 35 or less, and the Abbe number of the fifth lens 135 may be the smallest among the lenses of the optical system, and may be less than 25.

In the optical system or the first to eighth lenses 131, 132, 133, 134, 135, 136, 137 and 138, the number of lenses having a refractive index of 1.6 or more at 587 nm may be 3 or more, and the number of lenses having a refractive index of less than 1.6 may be 5 or less. For example, the second, fifth, and eighth lenses 132, 135, and 138 at 587 nm may have a refractive index of 1.6 or more, and the first, third, fourth, sixth, and seventh lenses 131, 133, 134, 136, and 137 may have a refractive index of less than 1.6.

In the optical system or the first to eighth lenses 131, 132, 133, 134, 135, 136, 137, and 138, the number of lenses having a center thickness of 0.5 mm or more may be 5 or more, and the number of lenses having a center thickness of less than 0.5 mm may be 3 or less. For example, the thicknesses T1, T2, and T3 of the centers of the first to third lenses 131, 132, and 133 may satisfy the following relationship: T3<T2<T1, and the thicknesses T3, T4, T5, and T6 of the centers of the third to sixth lenses 133, 134, 135, and 136 satisfies the following condition: T5<T6<T4≤T3, and the difference between the center thicknesses T3 and T4 of the third and fourth lenses 133 and 134 may be 1 mm or less, and the thicknesses T7 and T8 of the seventh lens 137 and the eighth lenses 137 and 138 may satisfy the following relationship: T8<<T6<T7<T1. Here, T1 to T8 are respective center thicknesses of the first to eighth lenses 131-138.

Looking at the intervals on the optical axis between the two adjacent lenses in the first to eighth lenses 131, 132, 133, 134, 135, 136, 137, and 138, the following relationship is satisfied: T78<T23<T67<T12, where T67 is the optical axis interval between the adjacent sixth and seventh lenses 136, 137, T23 is the optical axis interval between the second and third lenses 132 and 133, T78 is the optical axis interval between adjacent seventh and eighth lenses 137 and 138, and T12 is the optical axis interval between the first and second lenses 131 and 132. Here, the T12 may be 0.35 mm or more and may be greater than the center thickness of the fifth lens 135. T23 is 0.20 mm or less, and the optical axis interval T67 between the sixth and seventh lenses 136 and 137 may be equal to or greater than the optical axis interval between the fifth and sixth lenses 135 and 136. Looking at the interval between the seventh lens 137 and the eighth lens 138, the optical axis interval between two adjacent apexes on the optical axis may be smaller than the interval between the two adjacent peripheral parts.

When the refractive power of each of the first to eighth lenses 131, 132, 133, 134, 135, 136, 137, and 138 is P1 to P9, when their refractive powers represent absolute values, the following relationship may be satisfied: P2<P6<P3 or/and P3≤P5<P1<P7≤P8≤P4.

Looking at the focal lengths of the first to eighth lenses 131, 132, 133, 134, 135, 136, 137, and 138, the focal length of the second lens 132 may be the largest, and may be in the range of 15 mm or more, for example, 15 mm to 50 mm or 20 mm to 45 mm. The focal length of the sixth lens 136 may be smaller than the focal length of the second lens 132 and greater than the focal length of the third lens 133.

In an edge thickness of each of the first to eighth lenses 131, 132, 133, 134, 135, 136, 137, and 138, the number of lenses having an edge thickness of 0.50 mm or more may be 3 or more, the number of lenses having an edge thickness of less than 0.50 mm may be 6 or less, and the number of lenses having an edge thickness of less than 0.3 mm may be 2 or less.

Table 5 below is a value showing data of the radius of curvature, thickness, interval, refractive index, and Abbe's number of the surface of each lens of the third embodiment shown in FIG. 5.

TABLE 5

| Lens | Surface | Radius (mm) of curvature | Curvature (mm) | Thickness(mm)/ Interval(mm) | Index | Abbe # |
|---|---|---|---|---|---|---|
| Lens 1 | S1 | −3.621 | −0.2762 | 0.961 | 1.5334 | 56.5333 |
|  | S2 | 2.488 | 0.4019 | 0.505 |  |  |
| Lens 2 | S3 | 3.815 | 0.2621 | 0.754 | 1.6199 | 25.5912 |
|  | S4 | 4.185 | 0.2389 | 0.124 |  |  |
| Lens 3 | S5 | 25.905 | 0.0386 | 0.537 | 1.5334 | 56.5333 |
|  | S6 | −2.495 | −0.4008 | 0.032 |  |  |
| Aperture | Stop | Infinity |  | −0.014 |  |  |
| Lens 4 | S7 | 6.904 | 0.1448 | 0.542 | 1.5334 | 56.5333 |
|  | S8 | −1.071 | −0.9341 | 0.030 |  |  |

TABLE 5-continued

| Lens | Surface | Radius (mm) of curvature | Curvature (mm) | Thickness(mm)/ Interval(mm) | Index | Abbe # |
|---|---|---|---|---|---|---|
| Lens 5 | S9 | 3.702 | 0.2701 | 0.220 | 1.6580 | 21.4942 |
|  | S10 | 1.371 | 0.7294 | 0.174 |  |  |
| Lens 6 | S11 | 2.239 | 0.4467 | 0.421 | 1.5334 | 56.5333 |
|  | S12 | 3.201 | 0.3124 | 0.191 |  |  |
| Lens 7 | S13 | −4.127 | −0.2423 | 0.512 | 1.5334 | 56.5333 |
|  | S14 | −0.869 | −1.1507 | 0.055 |  |  |
| Lens 8 | S15 | 1.331 | 0.7514 | 0.251954 | 1.6199 | 25.5912 |
|  | S16 | 0.572 | 1.7498 | 0.20 |  |  |
| Optical filter | S17 | Infinity |  | 0.11 |  |  |
|  | S18 | Infinity |  | 0.40 |  |  |

In Table 5, the thickness is the center thickness (mm) of each lens of FIG. 5, and the interval is the distance (mm) between two adjacent lenses. S17 denotes the incident side surface of the optical filter, and S18 denotes the exit surface of the optical filter. Table 6 shows the effective radius (Semi-Aperture), edge thickness, power value, and focal length of each lens of FIG. 5.

TABLE 6

| Lens | Sur-face | Semi-Aperture (mm) | Edge thickness(mm) | Power | Focal length(mm) |
|---|---|---|---|---|---|
| Lens 1 | S1 | 2.470 | 0.9224 | −0.3815 | −2.6212 |
|  | S2 | 1.069 |  |  |  |
| Lens 2 | S3 | 0.922 | 0.7540 | 0.02558 | 39.0862 |
|  | S4 | 0.549 |  |  |  |
| Lens 3 | S5 | 0.511 | 0.4890 | 0.2328 | 4.2945 |
|  | S6 | 0.457 |  |  |  |
| Aperture | Stop | 0.455 |  |  |  |
| Lens 4 | S7 | 0.455 | 0.3181 | 0.5618 | 1.7797 |
|  | S8 | 0.613 |  |  |  |
| Lens 5 | S9 | 0.700 | 0.3804 | −0.2909 | −3.4372 |
|  | S10 | 0.807 |  |  |  |
| Lens 6 | S11 | 0.956 | 0.1738 | 0.08252 | 12.1180 |
|  | S12 | 1.025 |  |  |  |
| Lens 7 | S13 | 1.046 | 0.2270 | 0.5110 | 1.9569 |
|  | S14 | 1.131 |  |  |  |
| Lens 8 | S15 | 1.145 | 0.7048 | −0.5403 | −1.8508 |
|  | S16 | 1.60 |  |  |  |

FIG. 6, is an analysis graph showing longitudinal spherical aberration, astigmatism, and distortion aberration of the optical system of FIG. 5. According to the optical system according to the second embodiment, spherical aberration may be a phenomenon in which the focusing positions of light passing through different parts (e.g., the central part and the peripheral part) of the lens are changed. The horizontal axis represents the degree of longitudinal spherical aberration, and the vertical axis represents the normalization of the distance from the center of the optical axis, and the change of the longitudinal spherical aberration according to the wavelength of light may be shown. The longitudinal spherical aberration may be exhibited, for example, for light having a wavelength of about 656.2725 nm, about 587.5618 nm, about 546.0740 nm, about 486.1327 nm, or about 435.8343 nm, respectively. It may be seen that the longitudinal spherical aberration of the optical system is limited to within +0.025 to −0.025, showing stable optical properties. Astigmatism in the optical system is when the meridian plane (or tangential plane) and the sagittal plane of the lens have different radii, the focus of the light passing through the vertical direction and the horizontal direction may be out of focus. Astigmatism of the optical system is a result obtained at a wavelength of about 546.0740 nm. The solid line indicates astigmatism (e.g., meridional curvature) in the tangential direction, and the dotted line indicates astigmatism (e.g., spherical surface curvature) in the sagittal direction. As can be seen from FIG. 6, it can be confirmed that the astigmatism is limited to within +0.050 to −0.050 to show stable optical properties.

According to the optical system, distortion aberration occurs because the optical magnification changes according to the distance from the optical axis (O-I), and the image formed on the actual imaging plane (e.g., 190 in FIG. 1) may appear larger or smaller than the image formed on the theoretical imaging plane. The distortion of the optical system is a result obtained at a wavelength of about 546.0740 nm, and the image captured through the optical system may be slightly distorted at a point deviating from the optical axis O-I. However, such distortion is generally at a level that can be seen in an optical device using a lens, and the distortion rate is less than about 3%, so that good optical properties may be provided.

As in the first to third embodiments, it may be seen that each lens may be formed of a plastic lens, and all surfaces of each lens have aspheric coefficients. The aperture stop ST may be disposed around the third lens 113, 123, and 133 and the fourth lens 114, 124, and 134. In the first to third embodiments of the invention, the center thickness of the first lenses 111, 121, and 131 is the thickest among the lenses of the optical system, and the first interval between the first lenses 111, 121, 131 and the second lenses 112, 122, 132 along the optical axis may be greater than the second interval between the sixth lens 116, 126, 136 and the seventh lens 117, 127, 137, or may be greater than the optical axis interval between the fourth lens 114, 124, 134 to the sixth lens 116, 126, 136.

The optical system according to the first to third embodiments of the invention may satisfy at least one or two or more of the following equations. Accordingly, the optical systems according to the first to third embodiments may have optically improved effects.

In the optical system of the first to third embodiments, at least one, two or more, or both of the following equations may be satisfied.

$$0.5 < f4/F < 1.5 \qquad \text{[Equation 1]}$$

Here, F is the effective focal length of the optical system, and f4 is the focal length of the fourth lens. When the f4/F value is out of the above range, it may affect the improvement of resolution, and may be, for example, 1.22.

$$1.4 < nd1 < 1.6 \qquad \text{[Equation 2]}$$

The nd1 is the refractive index of the first lens at 587 nm (d-line). When the refractive index value of the first lens is out of the above range, it may affect the improvement of resolution, for example, it may be 1.53.

$$10 < vd5 < 30 \qquad \text{[Equation 3]}$$

Here, vd5 is the Abbe's number of the fifth lens, and when the Abbe number of the fifth lens is out of the above range, it may affect the improvement of resolution, and may be, for example, 21.49.

$$F/EPD>1 \qquad \text{[Equation 4]}$$

Here, EPD is the diameter of the entrance pupil of the optical system, and when the F/EPD value is out of the above range, it may affect the brightness of the optical system.

$$1<T1/T3<5 \qquad \text{[Equation 5]}$$

Here, T1 is the center thickness of the first lens, and T3 is the center thickness of the third lens.

$$1<T4/T5<5 \qquad \text{[Equation 6]}$$

Here, T4 is the center thickness of the fourth lens, and T5 is the center thickness of the fifth lens.

$$1<T7/T8<5 \qquad \text{[Equation 7]}$$

Here, T7 is the center thickness of the seventh lens, and T8 is the center thickness of the eighth lens.

When it is out of the above range in Equations 5 to 7, it may affect distortion reduction.

$$|f5|>|f4| \qquad \text{[Equation 8]}$$

Here, f5 is the focal length of the fifth lens, and f4 is the focal length of the fourth lens.

$$0.5<|f7|/|f8|<2 \qquad \text{[Equation 9]}$$

Here, f7 is the focal length of the seventh lens, and f8 is the focal length of the eighth lens.

In Equations 8 and 9, when it is out of the above range, it may affect the reduction of optical aberration.

The optical system according to the first to third embodiments of the invention may satisfy at least one, two or more, five or more, or all of Equations 1 to 9. In this case, the optical system may implement a high-quality and high-resolution imaging lens system. In addition, unnecessary light entering the optical system may be blocked by at least one of Equations 1 to 9, aberration may be corrected, and performance of the optical system may be improved.

Figure 7:
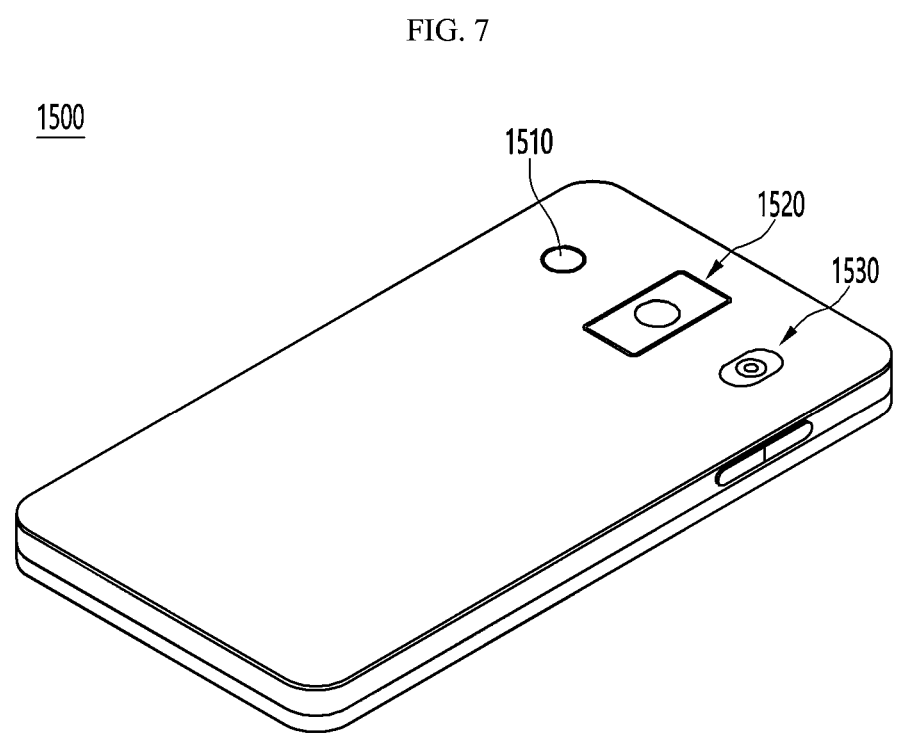

FIG. 7 is a perspective view illustrating an example of a moving device to which an optical system according to an embodiment(s) of the invention is applied.

As shown in FIG. 7, the mobile terminal 1500 may include a camera module 1520, a flash module 1530, and an autofocus device 1510 provided on one or the rear side. Here, the autofocus device 1510 may include a surface emitting laser device and a light receiving unit as a light emitting layer. The flash module 1530 may include an emitter emitting light therein. The flash module 1530 may be operated by a camera operation of a mobile terminal or a user's control. The camera module 1520 may include an image capturing function and an auto focus function. For example, the camera module 1520 may include an auto-focus function using an image. The auto-focus device 1510 may include an auto-focus function using a laser. The auto focus device 1510 may be mainly used in a condition in which the auto focus function using the image of the camera module 1520 is deteriorated, for example, in proximity of 10 m or less or in a dark environment.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:
a first lens, a second lens, a third lens, a fourth lens, a fifth lens, a sixth lens, a seventh lens, and an eighth lens, which are sequentially arranged along an optical axis in a direction from an object side to a sensor side,
wherein the first lens has negative refractive power and has a concave object-side surface on the optical axis,
wherein the fourth lens has both object-side and sensor-side surfaces that are convex on the optical axis, and has a refractive index of less than 1.6,
wherein the fifth lens has a concave sensor-side surface on the optical axis and has a refractive index of 1.6 or more,
wherein the seventh lens has positive refractive power and has a convex sensor-side surface on the optical axis,
wherein the seventh lens has a concave object-side surface on the optical axis,
wherein the eighth lens has a negative (−) refractive power and has a concave sensor-side surface on the optical axis, and
wherein the optical system satisfies Equation 1:

$$0.5<f4/F<1.5 \qquad \text{[Equation 1]}$$

where f4 is a focal length of the fourth lens and F is an effective focal length of the optical system.

2. The optical system of claim 1, wherein at least one of the following Equations 2, 3 and 4 is satisfied:

$$1.4<nd1<1.6 \qquad \text{[Equation 2]}$$

where nd1 is a refractive index at 587 nm of the first lens, $$10<vd5<30 \qquad \text{[Equation 3]}$$

where vd5 is an Abbe number of the fifth lens, $$F/EPD>1 \qquad \text{[Equation 4]}$$

where EPD is an incident pupil diameter of the optical system.

3. The optical system of claim 1, wherein at least one of the following Equations 5, 6 and 7 is satisfied:

$$1<T1/T3<5 \qquad \text{[Equation 5]}$$

$$1<T4/T5<5 \qquad \text{[Equation 6]}$$

$$1<T7/T8<5 \qquad \text{[Equation 7]}$$

where T1 is a center thickness of the first lens,
T3 is a center thickness of the third lens,
T4 is a center thickness of the fourth lens,
T5 is a center thickness of the fifth lens,
T7 is a center thickness of the seventh lens, and
T8 is a center thickness of the eighth lens.

4. The optical system of claim 1, comprising at least one of following Equations 8 and 9:

$$|f5| > |f4| \qquad \text{[Equation 8]}$$

$$0.5 < |f7|/|f8| < 2 \qquad \text{[Equation 9]}$$

where f4 is the focal length of the fourth lens,
f5 is a focal length of the fifth lens,
f7 is a focal length of the seventh lens, and
f8 is a focal length of the eighth lens.

5. The optical system of claim 1, wherein a thickness of a center of the first lens is thicker than a thickness of each of centers of the second to eighth lenses, and
wherein an optical axis interval between the first lens and the second lens is larger than optical axis intervals between adjacent two lenses of the second to eighth lenses.

6. The optical system of claim 1, wherein a number of lenses having a convex object-side surface on the optical axis of the first to eighth lenses is four or more,
wherein a number of lenses having a concave object-side surface is four or less, and
wherein the third lens has positive refractive power and has a convex sensor-side surface on the optical axis.

7. The optical system of claim 1, wherein a number of lenses having a convex sensor-side surface on the optical axis of the first to eighth lenses is four or more, and
wherein a number of lenses having a concave sensor-side surface is four or less.

8. The optical system of claim 7, wherein the sensor-side surfaces of the first, fifth, sixth, and eighth lenses are concave.

9. The optical system of claim 1, wherein a number of lenses having an Abbe number of 50 or more is five or more, and a number of lenses having an Abbe number of less than 50 is three or less, among the first to eighth lenses.

10. The optical system of claim 1, wherein a number of lenses having a refractive index of the lenses of 1.6 or more among the first to eighth lenses is three or more, and
wherein a number of lenses having a refractive index of less than 1.6 is five or less.

11. The optical system of claim 1, wherein a number of lenses having a center thickness of 0.5 mm or more of the first to eighth lenses is three or more, and a number of lenses having a thickness of less than 0.5 mm is five or less,
when center thicknesses of the first, second, and third lenses are T1, T2, and T3, respectively, a following relation is satisfied: T3<T2<T1, and
wherein the thickness of the center of the first lens is greater than an optical axis interval between the first lens and the second lens.

12. The optical system of claim 1, wherein when center thicknesses of the third to sixth lenses are T3, T4, T5, and T6, respectively, a following relation is satisfied: T5≤T3<T6<T4.

13. The optical system of claim 1, wherein a focal length of the second lens is the largest among the first to eighth lenses, and
wherein the sixth lens has positive refractive power.

14. The optical system of claim 1, wherein effective diameters of object-side or sensor-side surfaces become smaller in an order of the first lens, the second lens, and the third lens with respect to the third lens, and
wherein the effective diameters of the object-side or sensor-side surfaces increase in an order of the third lens, the fourth lens, the fifth lens, and the sixth lens with respect to the third lens.

15. An optical system comprising:
a first lens, a second lens, a third lens, a fourth lens, a fifth lens, a sixth lens, a seventh lens, and an eighth lens, which are sequentially arranged along an optical axis in a direction from an object side to a sensor side,
wherein the first lens has negative refractive power and has a concave object-side surface on the optical axis,
wherein the fourth lens has both object-side and sensor-side surfaces that are convex on the optical axis, and has a refractive index of less than 1.6,
wherein the fifth lens has a concave sensor-side surface on the optical axis and has a refractive index of 1.6 or more,
wherein the seventh lens has positive refractive power and has a convex sensor-side surface on the optical axis,
wherein the seventh lens has a concave object-side surface on the optical axis,
wherein the eighth lens has a negative (−) refractive power and has a concave sensor-side surface on the optical axis,
wherein a number of lenses with a convex object-side surface on the optical axis in the first to eighth lenses is four or more,
wherein a number of the lenses with a concave sensor-side surface is five or less, and
wherein a number of surfaces having an inflection point among object-side surfaces and sensor-side surfaces of the first to eighth lenses is four or more.

16. The optical system of claim 15, comprising: an image sensor disposed on a sensor side of the eighth lens; and
an optical filter disposed between the image sensor and the eighth lens,
wherein the optical system satisfies at least one of the following Equations 1 to 4:

$$0.5 < f4/F < 1.5 \qquad \text{[Equation 1]}$$

where f4 is a focal length of the fourth lens, F is an effective focal length of the optical system, $$1.4 < nd1 < 1.6 \qquad \text{[Equation 2]}$$

where nd1 is a refractive index of the first lens at 587 nm, $$10 < vd5 < 30 \qquad \text{[Equation 3]}$$

where vd5 is an Abbe's number of the fifth lens, $$F/EPD > 1 \qquad \text{[Equation 4]}$$

where EPD is an incident pupil diameter of the optical system.

17. The optical system of claim 15, comprising an aperture stop disposed between the third lens and the fourth lens,
wherein the third lens has positive refractive power and has a convex sensor-side surface on the optical axis.

18. The optical system of claim 15, wherein a thickness of a center of the first lens is thicker than a thickness of each of centers of the second to fourth lenses, and
wherein the thickness of the center of the first lens is greater than an optical axis interval between the first lens and the second lens.

19. The optical system of claim 18, wherein the optical axis interval between the first lens and the second lens is larger than optical axis intervals between adjacent two lenses of the second to eighth lenses.

20. The optical system of claim 15, wherein a thickness of a center of the first lens is thicker than a thickness of each of centers of the fourth and seventh lenses, and
wherein the sixth lens has positive refractive power.

* * * * *